United States Patent
Aiuchi et al.

(10) Patent No.: US 6,766,209 B2
(45) Date of Patent: Jul. 20, 2004

(54) MANAGING SYSTEM, MANAGING METHOD, HOST COMPUTER, AND INFORMATION COLLECTING/TRANSMITTING UNIT

(75) Inventors: Takashi Aiuchi, Kikuchi-gun (JP); Makoto Kiyota, Kikuchi-gun (JP); Ryouichi Uemura, Kikuchi-gun (JP); Michio Tanaka, Kikuchi-gun (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/178,020

(22) Filed: Jun. 24, 2002

(65) Prior Publication Data

US 2003/0023454 A1 Jan. 30, 2003

(30) Foreign Application Priority Data

Jun. 25, 2001 (JP) .......................... 2001-191926
Jun. 27, 2001 (JP) .......................... 2001-194325

(51) Int. Cl.$^7$ .......................................... G06F 19/00
(52) U.S. Cl. ................................ 700/110; 700/121
(58) Field of Search ................... 700/110, 121, 700/108, 96; 438/7, 14

(56) References Cited

U.S. PATENT DOCUMENTS 5,811,211 A * 9/1998 Tanaka et al. ............... 430/30
5,886,909 A * 3/1999 Milor et al. ................. 716/4
5,940,300 A * 8/1999 Ozaki ........................ 700/121
6,089,763 A * 7/2000 Choi et al. .................. 396/611
6,385,497 B1 * 5/2002 Ogushi et al. ............... 700/110
6,445,969 B1 * 9/2002 Kenney et al. .............. 700/108
6,661,931 B1 * 12/2003 Kawada ...................... 382/276
2002/0183880 A1 * 12/2002 Arima et al. ................ 700/110

OTHER PUBLICATIONS

U.S. patent application Ser. No. 10/023,898, filed Dec. 21, 2001, pending.
U.S. patent application Ser. No. 10/114,248, filed Apr. 3, 2002, pending.
U.S. patent application Ser. No. 10/178,020, filed Jun. 24, 2002, pending.

* cited by examiner

*Primary Examiner*—Leo Picard
*Assistant Examiner*—Alexander Kosowski
(74) *Attorney, Agent, or Firm*—Oblon, Spivak, McClelland, Maier & Neustadt, P.C.

(57) ABSTRACT

The present invention is a managing system for managing a processing system of a substrate and it has an information accumulation section for accumulating information on the processing system, an information collecting unit for collecting the information from the information accumulation section, and a managing unit for obtaining the information in the information collecting unit via the Internet or an intranet to manage the processing system based on this information.

42 Claims, 21 Drawing Sheets

MANAGING SYSTEM, MANAGING METHOD, HOST COMPUTER, AND INFORMATION COLLECTING/TRANSMITTING UNIT

BACKGROUND OF THE INVENTION

1. Field of the Invention

The present invention relates to a managing system and a managing method of a processing system of a substrate, and a host computer and an information collecting/transmitting unit thereof.

2. Description of the Related Art

Semiconductor device fabrication is carried out in a coating and developing system, an aligner, an etching unit, and so on which are installed in a factory. For example, on the coating and developing system, a plurality of units such as a resist coating unit, a developing unit, and a heating unit are mounted, where a series of photolithography processes in the semiconductor device fabrication are carried out.

When a trouble occurs in the coating and developing system in operation, a person in charge of process or the like who is a manager on a factory side handles the trouble, and when the person in charge of process cannot handle the trouble, the person in charge of process or the like gets in contact with an engineer who is a manager on a vendor side which is a manufacturer of the coating and developing system by means of telephone and so on, and the engineer handles the trouble. When the trouble can be solved only by giving instructions through telephone and so on, the engineer on the vendor side handles the trouble in a vendor's office, but he/she usually visits the factory to handle the trouble since it is necessary for him/her to grasp the situation in more detail and to take an appropriate measure.

However, since sales areas of coating and developing systems covers a wide range including foreign countries and so on due to today's globalization of the market, it sometimes takes a lot of time for the engineer on the vendor side to reach the factory. Meanwhile, in the case when the trouble is handled only by communication through telephone, facsimile, and the like, an appropriate measure cannot be taken since there is a limit in obtaining information on the condition, the cause, and so on of the failure, and as a result, it also sometime takes a lot of time until the coating and developing system is recovered. Moreover, when failures occur in a plurality of places at the same time, a plurality of people are forced to handle them, which sometimes causes different quality of the measures since an inexperienced, unskilled engineer is also included among them.

Meanwhile, a substrate processed in the aforesaid coating and developing system is carried to an examining unit, where the substrate processing condition is examined. When it is found from the result of the examination that the substrate is not appropriately processed, it is necessary to specify its cause and correct and improve a processing unit or the like which has caused this condition.

However, the manager on the factory side who conducts the examination of the substrate does not usually have a good knowledge of such a coating and developing system. Therefore, even when a poor condition is recognized in the substrate processing condition, its cause cannot be found only by the manager on the factory side and this task is often entrusted to the person in charge on the vendor side which is the manufacturer of the processing system. The person in charge entrusted with this task gives an instruction through telephone and so on in the office of the vendor side or he/she goes to the factory side to handle the poor condition himself/herself.

However, in the case when the person in charge on the vendor side gives the instruction while staying in the office, detailed information on the processing condition of the substrate in which the poor condition is recognized in the examination cannot be obtained only through telephone and so on. Because of this, the person in charge on the vendor side cannot select a proper countermeasure and give the instruction to the manager on the factory side. Therefore, there is a concern that the manager on the factory side cannot take an appropriate measure for the examination result. Meanwhile, in the case when the person in charge on the vendor side visits the factory side, since the factory and the office of the vendor are usually distant from each other, it takes time for him/her to reach the factory and quick measures cannot be taken. Furthermore, in the case when the poor conditions occur in a plurality of places at the same time and persons in charge on the vendor side are sent to the plural places at the same time, the qualities of the correction and improvement work are not sometimes equal since the persons in charge who do not have the same level of experience are sent. Therefore, there is a concern that an appropriate measure according to the examination result cannot be taken and a lot of time is required for the correction and improvement of the processing condition, depending upon which person in charge is sent.

SUMMARY OF THE INVENTION

The present invention is made from the above viewpoint and it is an object of the present invention to enable the acquisition of sufficient information even from a distant place and quick and appropriate management of a processing system such as a coating and developing system based on this information. It is a second object of the present invention to enable a quick and appropriate measure to be taken for an examination result of a substrate.

The present invention has an information accumulation section for accumulating information on the aforesaid processing system, an information collecting unit for collecting the information from the information accumulation section, and a managing unit for obtaining the information in the information collecting unit via the Internet or an intranet to manage the processing system based on this information.

According to another aspect of the present invention, the present invention is a managing method of managing a processing system of a substrate, in which an information collecting unit collects information on the processing system which is accumulated in an information accumulation section of the processing system according to an instruction of a managing unit, and the managing unit obtains the information via the Internet or an intranet to manage the processing system based on the information.

By thus providing the information accumulation section for accumulating the information on the processing system of the substrate, the information collecting unit for collecting the information in the information accumulation section, and the managing unit which is connected to the information collecting unit via the Internet or the intranet, it is made possible, for example, for a manager on a managing unit side in a distant place to obtain necessary and sufficient information for managing the processing system via the Internet or the like. This enables the manager on the managing unit side to appropriately manage the processing system based on the obtained information while staying on the managing unit side. Therefore, he/she does not have to visit a factory side where the processing system is installed each time so that, for example, a trouble and so on of the processing system can also be handled quickly. Moreover, since in many cases, an experienced manager on the managing unit side can handle the trouble, a more appropriate measure can be taken.

Incidentally, the aforesaid information also includes information indicating the operation status of the processing system itself, information indicating the operation status of each of units in the processing system, measurement information and drive information in the units, their history information, maintenance information on parts and so on used in the processing system and each of the units, examination information on the processed substrate, and so on. The aforesaid management also includes maintenance of the processing system.

The aforesaid information accumulation section may be provided in the processing system. Furthermore, the processing system may have a plurality of processing units and the information on each of the units may be accumulated in the information accumulation section. The information on each of the units of the processing system is thus accumulated in the information accumulation section so that the information on each of the processing units can easily be obtained in the managing unit side and appropriate management is made possible by obtaining information on a specific processing unit when necessary. Incidentally, the information on each of the units includes, for example, information indicating the operation status of the units, measurement information and drive information in the units, their history information, maintenance information on parts and so on used in the units, examination information on the processed substrate, and so on.

Further, as management information which is dealt in the present invention, information on, for example, change and adjustment of setting, a cleaning command, part exchange, and software exchange of the processing system; and information a change and adjustment of setting, a cleaning command, part exchange, and so on of the units of the processing system can be listed.

According to still another aspect of the present invention, the present invention is a managing system for managing a processing system of a substrate, in which an examining unit for examining the substrate processed in the processing system is provided on a factory side where the processing system is installed, and a host computer for obtaining through the Internet examination information on the substrate which is examined in the examining unit is provided on a side of a vendor of the processing system.

According to yet another aspect of the present invention, the present invention is a host computer constituting a managing system for managing a processing system of a substrate in a factory and provided on a side of a vendor of the processing system, comprising a communication unit for obtaining via the Internet examination information on the substrate processed in the processing system.

According to yet another aspect of the present invention, the present invention is an information collecting/transmitting unit constituting a managing system for managing a processing system of a substrate in a factory and provided in a factory side, comprising a communication unit for collecting examination information on the substrate processed in each of a plurality of processing systems and transmitting the examination information to a host computer on a vendor side via the Internet.

According to yet another aspect of the present invention, the present invention is a managing method of managing a processing system of a substrate, in which adopted are: an examining unit for examining the substrate processed in the processing system in a factory; an information collecting/transmitting unit which is able to collect examination information on the substrate examined in the examining unit and transmit the examination information via the Internet; and a receiving means provided on a vendor side, for receiving the examination information, and in which the examination information on the substrate examined in the examining unit is collected by the information collecting/transmitting unit and thereafter transmitted to the receiving means on the vendor side via the Internet, and the processing system is managed based on the examination information received by a manager on the vendor side.

According to the present invention, the host computer on the vendor side obtains the examination information on the substrate on the factory side via the Internet so that the manager on the vendor side can obtain the examination information in more detail. This enables the manager on the vendor side to be informed of the processing condition of the substrate while staying on the vendor side. Therefore, in the case, for example, when a poor condition of the substrate processing is detected from the examination information or in other cases like this, the manager on the vendor side can present an appropriate measure to the manager on the factory side based on the detailed examination information so that the poor condition can be solved appropriately and quickly. Therefore, the examination result of the substrate can be handled appropriately and quickly. Furthermore, even when poor conditions occur in a plurality of places, an experienced manager on the vendor side can obtain the detailed examination information while staying on the vendor side to give instructions to the plural factories so that the measures of the same quality can be taken in all the factories.

Further, according to the present invention, the manager on the vendor side is informed of the more detailed examination information. Therefore, in the case, for example, when the poor condition occurs in the processing system and in other cases like this, the manager on the vendor side can select a more appropriate countermeasure based on the examination information and present it to the manager on the factory side. Consequently, a more appropriate and quicker measure can be taken based on the obtained examination information.

Moreover, according to the present invention, even when the plural processing systems are provided in the factory, the information collecting/transmitting unit can collect the examination information on each of the processing systems in a centralized manner and send it to the host computer on the vendor side. This eliminates the necessity of providing an information collecting/transmitting means in each of the processing systems so that the entire configuration of the managing system can be simplified.

Furthermore, according to the present invention, the manager on the vendor side can obtain the more detailed examination information using the Internet so that, in the case, for example, when the processing system has the poor condition and in other cases like this, the manager on the vendor side can present a more appropriate countermeasure and so on to the manager on the factory side based on the examination information and the poor condition can be appropriately and quickly solved. Therefore, an appropriate and quick measure can be taken for the examination result of the substrate. Incidentally, the management of the processing system means to maintain, for example, the condition of the substrate processing carried out in the processing system at a predetermined standard or higher, and the management in the present invention includes not only a direct management by the manager on the vendor side in which the manager on the vendor side himself/herself operates the processing system but also an indirect management by giving an instruction to another person or by using other means.

DETAILED DESCRIPTION OF THE PREFERRED EMBODIMENT

Figure 1:
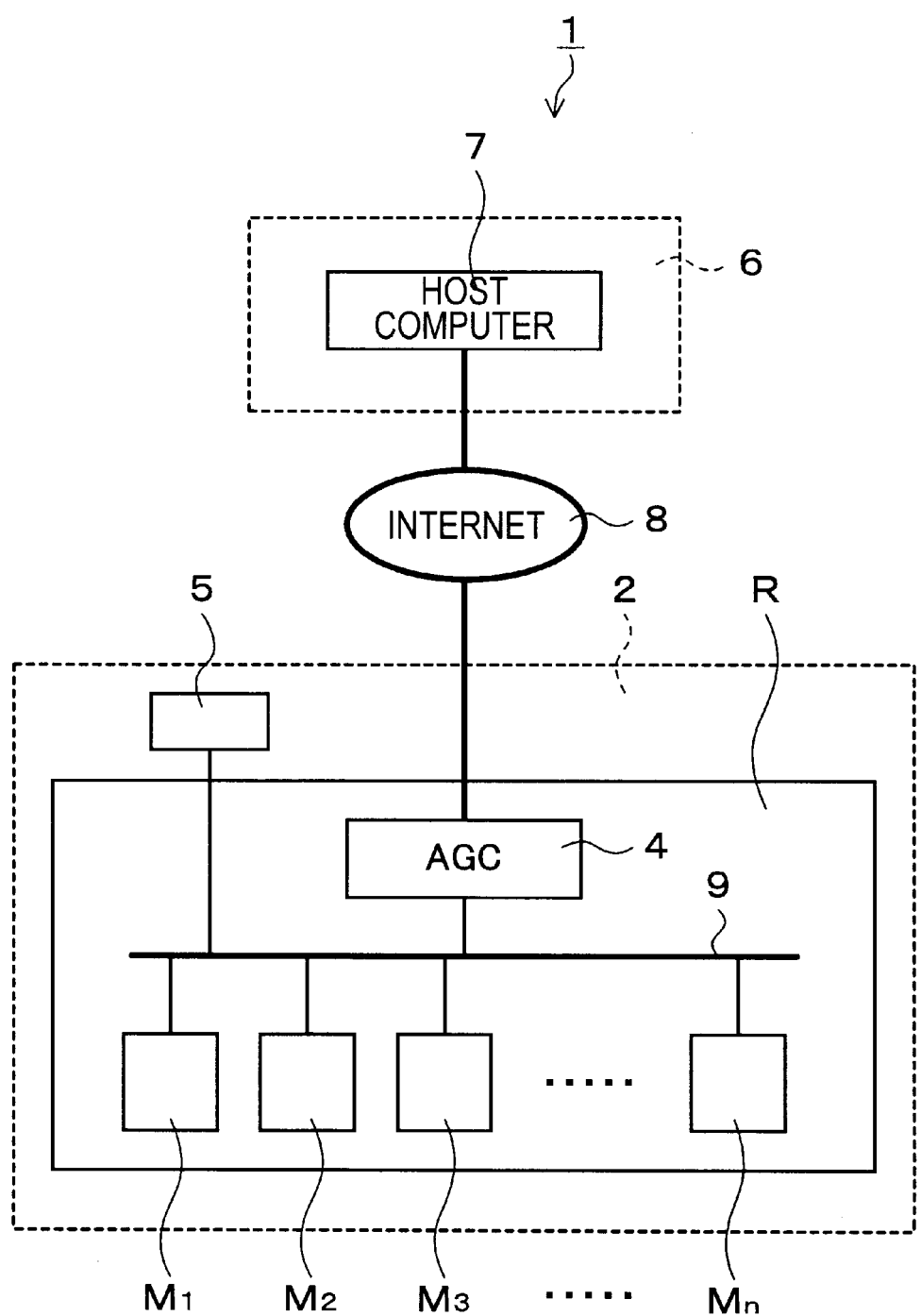
FIG. 1 is a schematic block diagram of a managing system according to an embodiment of the present invention.

Embodiments of the present invention will be explained below with reference to the drawings to detail the present invention. FIG. 1 is a schematic block diagram of a managing system 1 according to the embodiment of the present invention. This managing system 1 is a managing system for managing a coating and developing system as a processing system of a wafer W. The managing system 1 includes a plurality of coating and developing systems M1 to Mn, an AGC 4 (Advanced Group Computer) as an information collecting unit, and a computer 5 on a factory 2 side of, for example, a wafer maker and it has a host computer 7 as a managing unit on a vendor 6 side. The coating and developing systems M1 to Mn and the AGC 4 are installed in a clean room R inside the factory 2, and the computer 5 is installed outside the clean room R inside the factory 2.

The AGC 4 on the factory 2 side and the host computer 7 on the vendor 6 side are connected to each other via the Internet 8 to enable mutual communication between them. Not shown firewalls are provided on the factory 2 side and the vendor 6 side of the Internet 8 respectively to protect each of terminals. The plural coating and developing systems M1 to Mn, the AGC 4, and the computer 5 on the factory 2 side are connected to one another, for example, by a LAN 9 configured on the factory 2 side to enable mutual communication among them.

Figure 2:
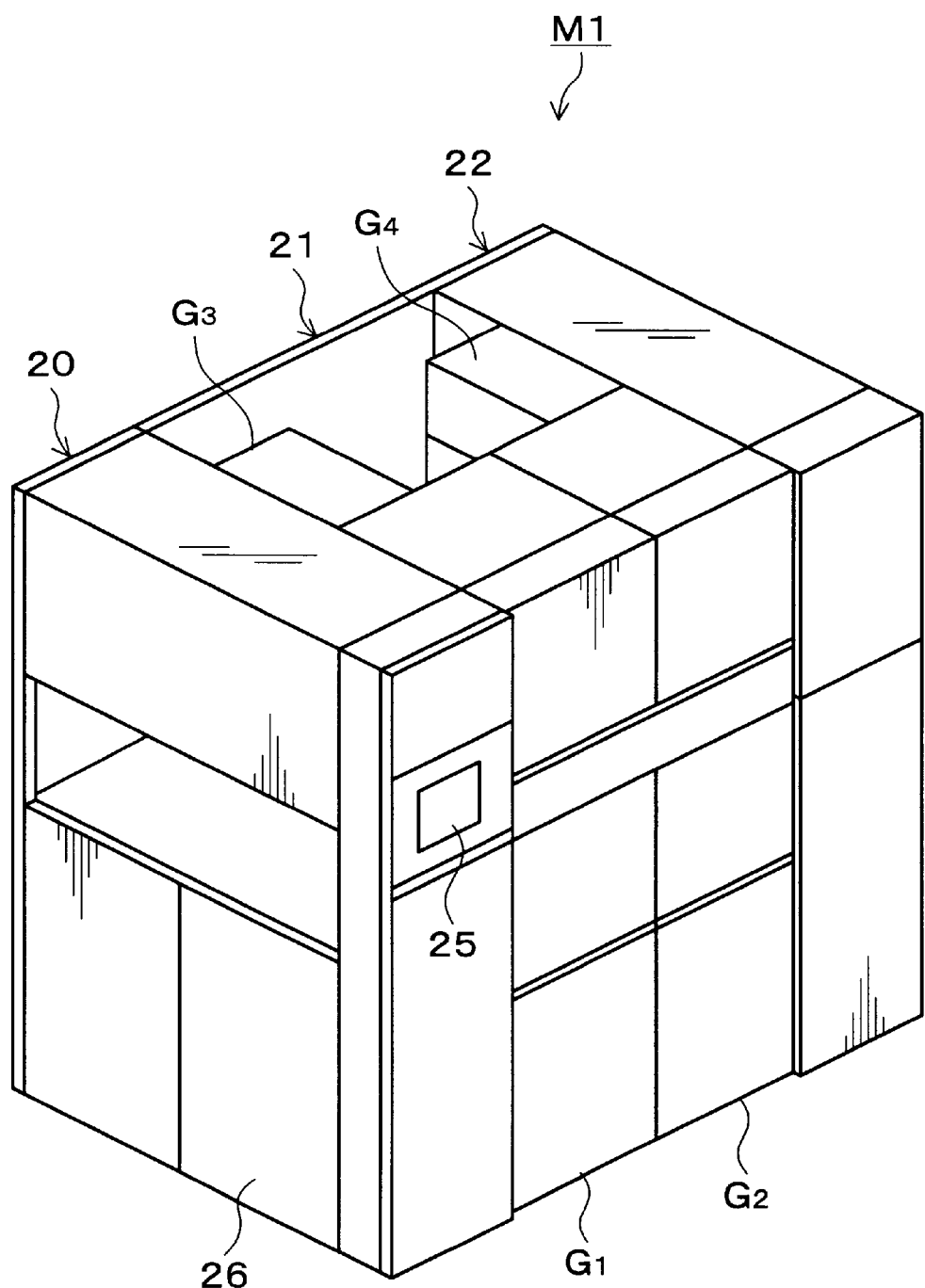
FIG. 2 is a perspective view showing the outline of a coating and developing system constituting the managing system.

The structure of the coating and developing systems M1 to Mn will be explained, taking the coating and developing system M1 for example. The coating and developing system M1 is a processing system which successively carries out photolithography processes in a fabrication process of the semiconductor wafer W. FIG. 2 is a perspective view showing the outlined structure of the coating and developing system M1 and FIG. 3 is a plan view showing the outlined structure of the coating and developing system M1.

As shown in FIG. 2, the coating and developing system M1, for example, is structured by integrally connecting a cassette station 20 for carrying, for example, 25 pieces of the wafers W in a unit of cassette to/from the coating and developing system M1 from/to the outside and carrying the wafers to/from a cassette C, a processing station 21 having a plurality of various kinds of processing units in which the wafers W are processed wafer by wafer, and an interface section 22 for delivering the wafers W to/from a not-shown aligner which is disposed adjacent to this processing station 21.

Figure 3:
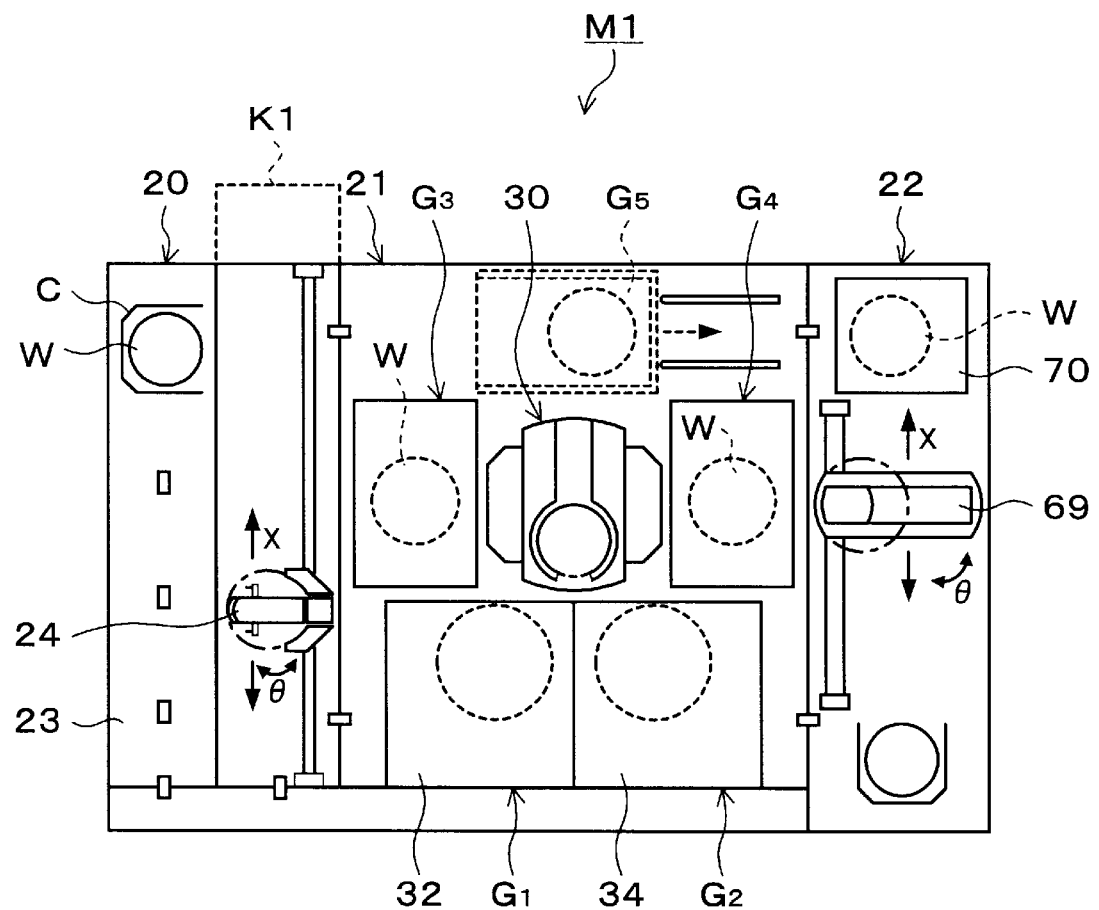
FIG. 3 is a plan view showing the outlined structure of the coating and developing system in FIG. 2.

The cassette station 20 has a wafer carrier 24 for carrying the wafer W to/from the cassette C mounted on a cassette mounting table 23 and carrying the wafer W to/from the processing station 21 as shown in FIG. 3. The cassette station 20 is also provided with an input section 25 of the coating and developing system M1 and a control section 26 which will be described later as shown in FIG. 2. The input section 25 is, for example, a touch screen which is a pointing device and is able to set and change various kinds of set values of the coating and developing system M1.

Figure 4:
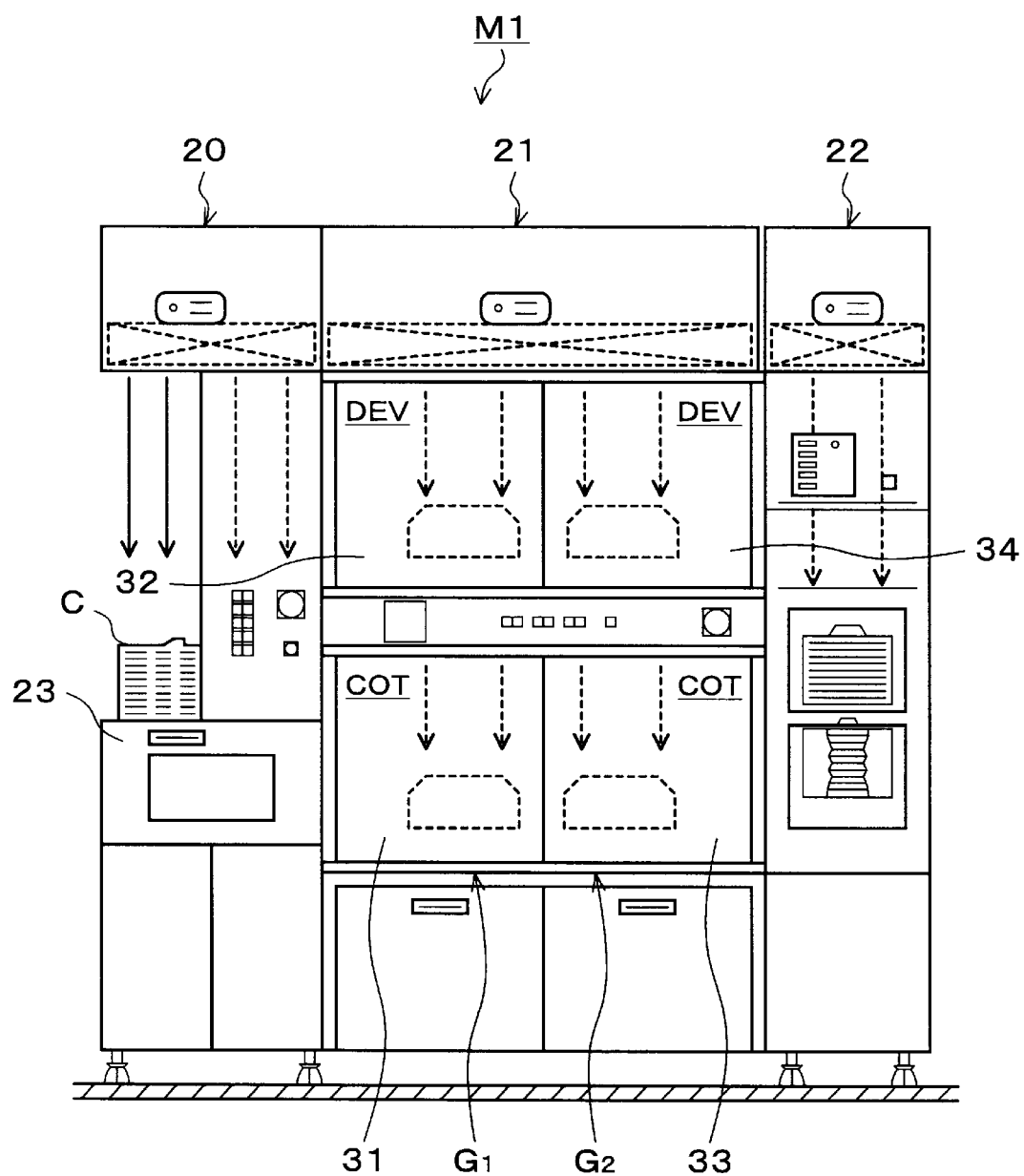
FIG. 4 is a front view of the coating and developing system in FIG. 2.

As shown in FIG. 3, the processing station 21 is provided with a main carrier unit 30 in a center part thereof, and on the periphery of this main carrier unit 30, a plurality of processing unit groups G1, G2, G3, G4 in which various kinds of the processing units are multi-tiered are provided. For example, the first and second processing unit groups G1, G2 are disposed on a front side of the coating and developing system M1, and in the first processing unit group G1, a resist coating unit 31 for coating the wafer W with a resist solution and a developing unit 32 for developing the wafer W are two-tiered from the bottom in this order as shown in FIG. 4. In the second processing unit group G2, a resist coating unit 33 and a developing unit 34 are similarly provided from the bottom in this order.

Figure 5:
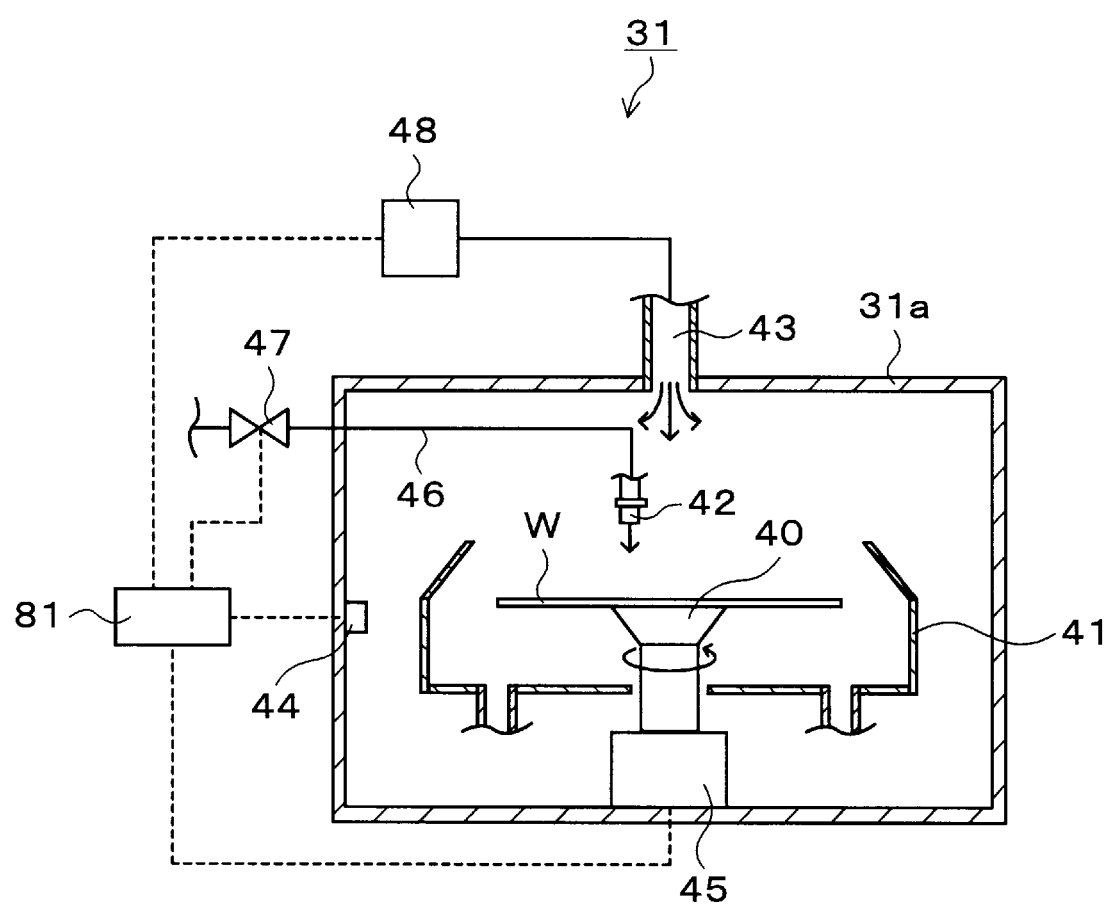
FIG. 5 is an explanatory view of a vertical cross section showing the outlined structure of a resist coating unit.

As shown in FIG. 5, for example, the resist coating unit 31 has in a casing 31a thereof a spin chuck 40 for holding the wafer W by suction and rotating the wafer W, a substantially cylindrical cup 41 surrounding the outside of the wafer W held by the spin chuck 40, a resist discharge nozzle 42 for discharging the resist solution from above the wafer W, a supply pipe 43 for supplying a purified gas into the casing 31a, a temperature/humidity sensor 44 for detecting the temperature and the humidity inside the casing 31a, and so on.

The spin chuck 40 is provided with a drive section 45 for rotating the spin chuck 40. The resist discharge nozzle 42 is connected to a resist solution supply pipe 46, and the resist solution supply pipe 46 is provided with an adjusting valve 47 for adjusting a discharge flow rate of the resist solution. Furthermore, the supply pipe 43 is provided with a temperature/humidity adjusting section 48 for adjusting the humidity and the temperature of the supplied gas. These drive section 45, adjusting valve 47, temperature/humidity adjusting section 48, and so on are controlled by a second control part 81 which will be described later. The temperature/humidity adjusting section 48 is controlled by the second control part 81 based on a detected value of the temperature/humidity sensor 44.

Figure 6:
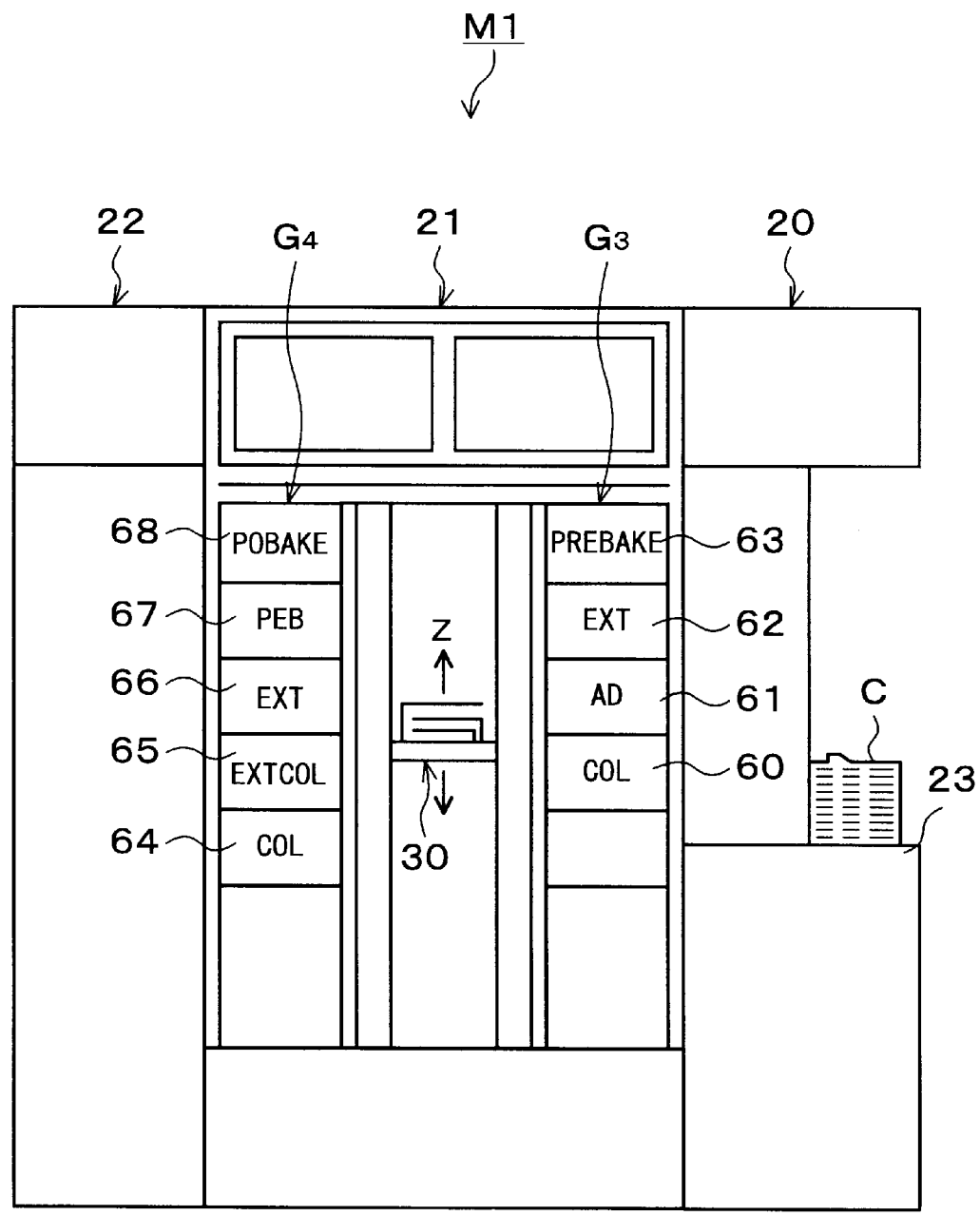
FIG. 6 is a rear view of the coating and developing system in FIG. 2.

The third processing unit group G3 of the processing station 21 is disposed adjacent to the cassette station 20 as shown in FIG. 3. As is shown in FIG. 6, in the third processing unit group G3, for example, a cooling unit 60 for cooling the wafer W, an adhesion unit 61 for enhancing adhesiveness between the resist solution and the wafer W, an extension unit 62 for delivering the wafer W therefrom/thereto, and a pre-baking unit 63 for vaporizing a solvent in the resist solution are, for example, four-tiered from the bottom in this order.

The fourth processing unit group G4 is disposed adjacent to the interface section 22. In the fourth processing unit group G4, for example, a cooling unit 64, an extension and cooling unit 65 for spontaneously cooling the mounted wafer W, an extension unit 66, a post-exposure baking unit 67 for performing heating processing after exposure, and a post-baking unit 68 for performing heating processing after developing treatment are, for example, five-tiered from the bottom in this order.

In the interface section 22, for example, a wafer carrier 69 and an edge exposure unit 70 are provided as shown in FIG. 3. The wafer carrier 69 is structured to be able to access to the extension and cooling unit 65 and the extension unit 66 which belong to the fourth processing unit group G4, the edge exposure unit 70, and the not shown aligner so that it can carry the wafer W to each of them. The edge exposure unit 70, which is a unit for exposing an outer circumference of the wafer W before the wafer W undergoes the exposure processing, has an irradiating section for irradiating a light for exposure, a CCD sensor for recognizing the position of the wafer W, and so on.

Figure 7:
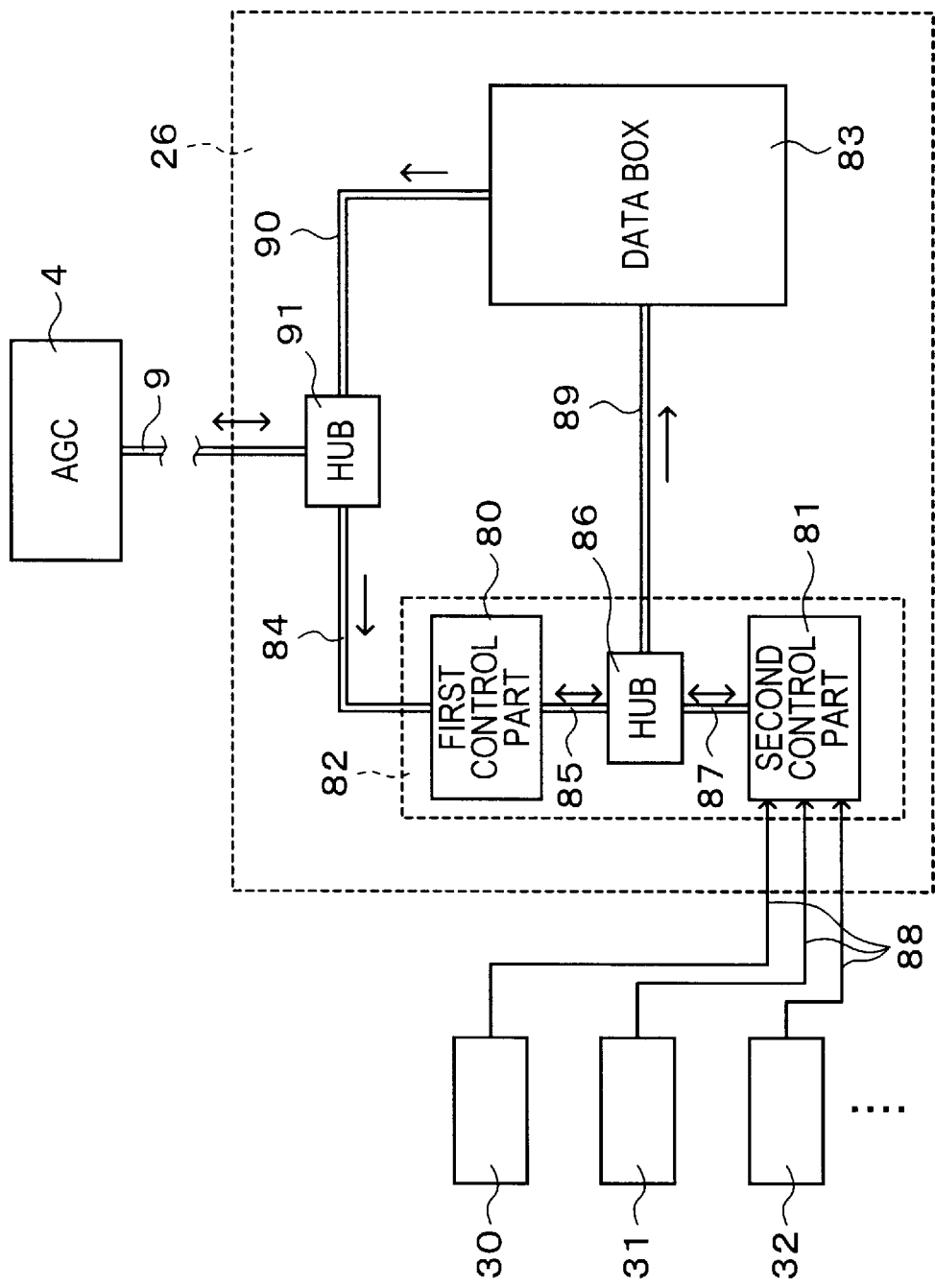
FIG. 7 is a block diagram showing the structure of a control section.

Next, the aforesaid control section 26 will be explained in detail. As shown in FIG. 7, the control section 26 has a control box 82 including a first control part 80 and the second control part 81 and a data box 83 as an information accumulation section for accumulating signals transmitted/received between the first control part 80 and the second control part 81.

The first control part 80 controls the entire body of the coating and developing system M1 and it mainly performs recipe control of the processing of the wafer W, carriage control of the wafer W, and so on based on a set process flow, recipe, and so on of coating and developing. The first control part 80 which is connected to the input section 25 by a not-shown information line, and a position signal inputted to the input section 25 by a worker or the like is outputted to the first control part 80 and is recognized as a set value. The first control part 80 is connected to the AGC 4 by an information line 84 and the LAN 9, and the AGC 4 outputs an instruction signal to the first control part 80. Therefore, the change and so on of the set value of the first control part 80 can be made also by the AGC 4.

The first control part 80 is connected to a HUB 86 by an information line 85, and an information line 87 connected to the second control part 81 is connected to the HUB 86. Therefore, signal transmission/receipt is possible between the first control part 80 and the second control part 81 so that the instruction signal received in the first control part 80 can be outputted to the second control part 81 via the information lines 85, 87.

The second control part 81 controls various kinds of the units in the aforesaid coating and developing system M1, namely, the main carrier unit 30, each of the processing units 30 to 34, 60 to 68, 70, and so on, and the second control part 81 and each of the units are connected by an information line 88. This enables the second control part 81 to control a drive section and so on of each of the units based on a predetermined set value, parameter value, and so on. Moreover, it can obtain detected information of a sensor and so on of each of the units to control each of the units based on this detected information.

The data box 83 is connected to the HUB 86 by an information line 89 and signals from the first control part 80 and the second control part 81 can be inputted thereto. By an information line 90, the data box 83 is connected to a HUB 91 which connects the information line 84 and the LAN 9 so that predetermined information accumulated in the data box 83 can be outputted to the AGC 4 via the information line 90 and the LAN 9.

Figure 8:
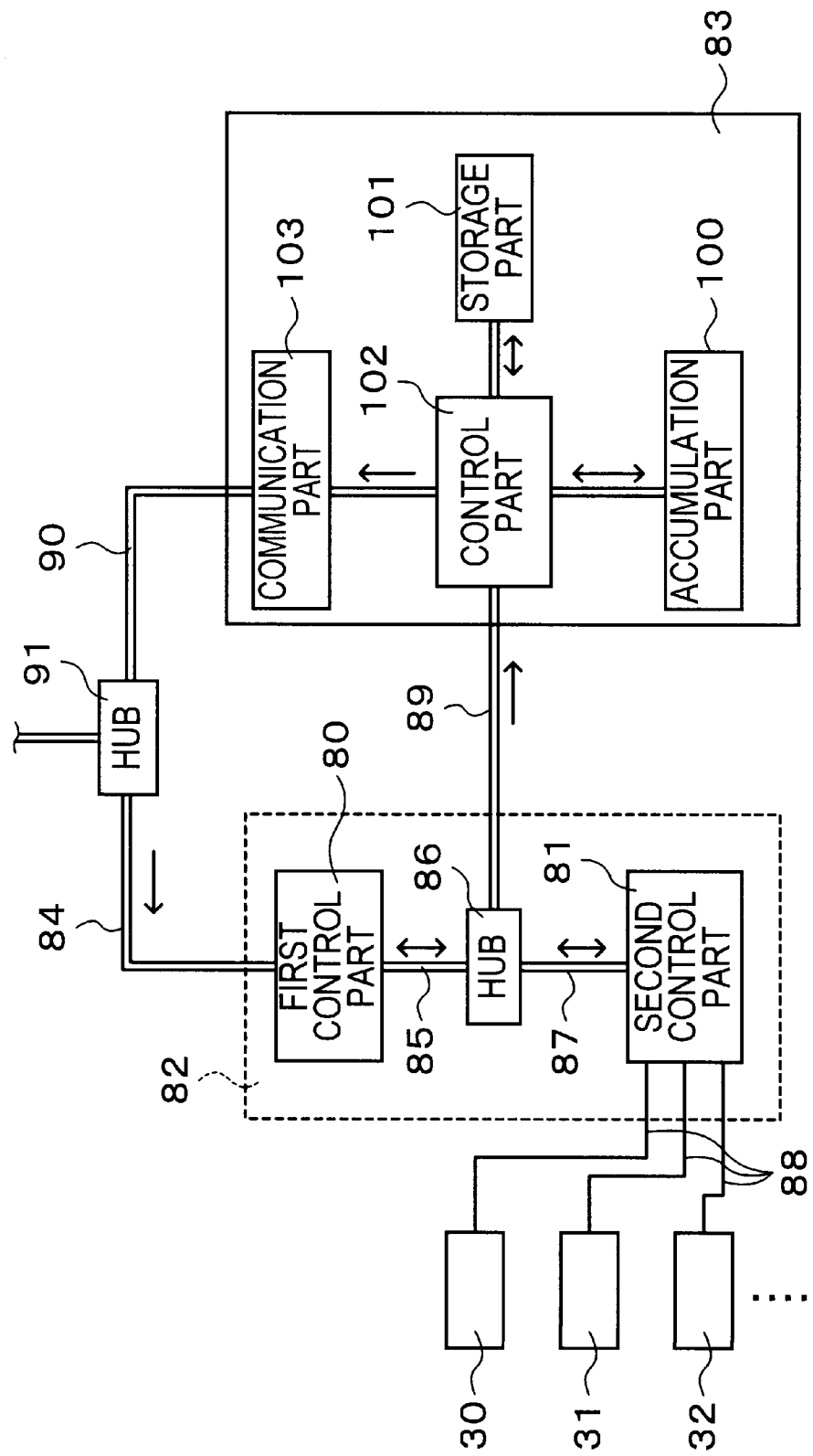
FIG. 8 is a block diagram showing the structure of a data box.

The data box 83 is composed of an accumulation part 100, a storage part 101, a control part 102, and a communication part 103 as shown in FIG. 8. The accumulation part 100 has a plurality of accumulation regions in which the signals inputted to the data box 83 from the first control part 80 and the second control part 81 are accumulated, and these signals can be accumulated, being classified, for example, into information on the entire coating and developing system M1, information on each of the units, and so on according to kinds of information indicated by the signals.

In the accumulation part 100, for example, as information on the entire coating and developing system M1, step timechart data on the recipe of the wafer W, data on the conveying cycle of the wafer, trace data on the temperature, humidity, air speed, and pressure in the coating and developing system M1, etc. are accumulated; as information on the main carrier unit 30, accumulated data on moving pulse and movement speed data are accumulated; and as information on the resist coating unit 31, trace data on the rotational speed of the wafer W, transfer data on the resist discharge nozzle 42, data on the discharge flow rate of the resist solution, trace data on the temperature and humidity in the casing 31a, data on the air speed in the cup 41, data on the temperature of the cup 41 itself, data on the vertical movement speed of the spin chuck 40, etc. are accumulated.

In the accumulation part 100, as data on the units of a heating system such as the pre-baking unit 63 and the units of a cooling system such as the cooling unit 60, trace data on the temperature of a plate on which the wafer W is placed, data on the vertical movement speed of a cover covering an area above the wafer W, trace data on the temperature, humidity, and air speed in the units of the heating system and the cooling system, data on the movement speed of a hoisting/lowering pin of the wafer W, and so on are accumulated. Especially, for a unit which belongs to the heating system and has a cooling function by blowing a gas onto a heating plate, data and so forth on the temperature, flow rate, and humidity of this gas may be accumulated in the accumulation part 100.

Furthermore, as information on the edge exposure unit 70, illuminance trace data, data on the position of the wafer W detected by the CCD sensor, and so on are accumulated, and as other information, trace data on the temperature of all the treatment solutions used in the coating and developing system M1, trace data on the pressure of a tank storing each of the treatment solutions, trace data on the exhaust pressure of each of the units, trace data on the pressure of all the gas system, trace data on supply power to the sensor for the processed wafer, data on the condition of the processed wafer, various kinds of image data, various kinds of Log of the above data, and so on are accumulated in the accumulation part 100.

In the storage part 101, stored are a signal accumulation program which causes the signals received from the first control part 80 and the second control part 81 to be classified according to their kinds and to be accumulated in predetermined accumulation regions of the accumulation part 100, a signal transmission program which takes out predetermined information from the accumulation region and transmits it to the AGC 4, and so on. As the storage part 101, for example, a RAM, a ROM, or the like is usable.

The control part 102 reads the signal accumulation program from the storage part 101 and executes it when receiving the signals from the first control part 80 and the second control part 81. Furthermore, for example, the control part 102 also reads the signal transmission program from the storage part 101 and executes it according to an accumulated information return signal from the AGC 4. As the control part 102, for example, a CPU or the like is usable.

The communication part 103, which is connected to the LAN 9 via the information line 90, can transmit/receive signalized information to/from the AGC 4. Therefore, it can receive the instruction signal from the AGC 4 and transmit the predetermined information read by the instruction signal to the AGC 4. As the communication part 103, for example, a LAN card, a modem, or the like is usable. For the communication by the communication part 103, for example, an ordinary communication protocol TCP/IP is usable.

Figure 9:
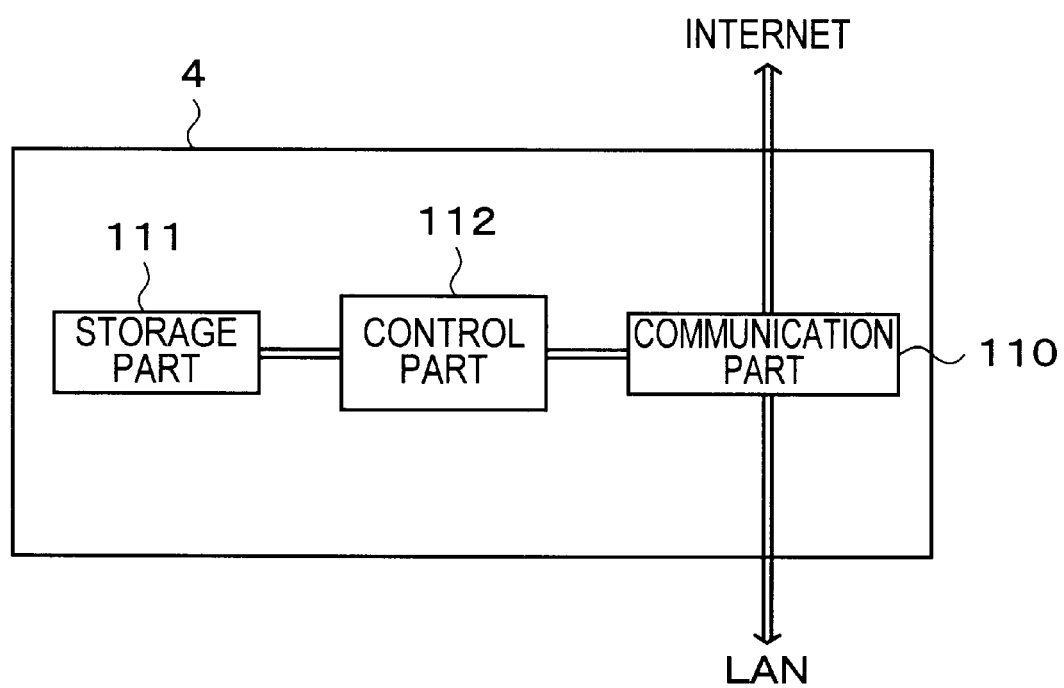
FIG. 9 is an explanatory view showing the structure of an AGC.

Next, the AGC 4 will be explained. The AGC 4 collects information on each of the coating and developing systems in the factory 2 and transmits it to the vendor 6 side, and furthermore, it supplies management information from the vendor 6 side or the like to the coating and developing systems M1 to Mn and manages and controls the coating and developing systems M1 to Mn. The AGC 4 is composed of, for example, a communication part 110, a storage part 111, and a control part 112 as shown in FIG. 9. For example, a modem, a RAM, and a CPU, or the like are usable as the communication part 110, the storage part 111, and the control part 112 respectively.

The communication part 110, which is connected to the LAN 9, can transmit/receive various kinds of signals to/from the computer 5 in the factory 2. The communication part 110, which is also connected to the Internet 8, can communicate with the host computer 7 on the vendor 6 side. For example, an ordinary communication protocol TCP/IP is usable for the communication.

The storage part 111 stores therein, for example, a signal processing program which can select the signals received in the AGC 4 and can also store and transmit it when necessary.

The control part 112 reads and executes the signal processing program when the signal is received in the AGC 4. Therefore, an information collection signal from the host computer 7 can be received, an accumulated information return signal can be transmitted to the coating and developing systems M1 to Mn based on this information collection signal, and accumulated information returned by them can be received to be transmitted to the host computer 7 and the computer 5. Further, it is possible to receive the management information, which is thought of, for example, on the vendor 6 side based on the accumulated information, for managing the coating and developing systems M1 to Mn and to manage each of the coating and developing systems M1 to Mn based on this management information The computer 5 on the factory 2 side enables a manager such as a person in charge of process on the factory 2 side to manage the coating and developing systems M1 to Mn and has a similar structure as that of, for example, an ordinary PC (Personal Computer) for industrial use.

Figure 10:
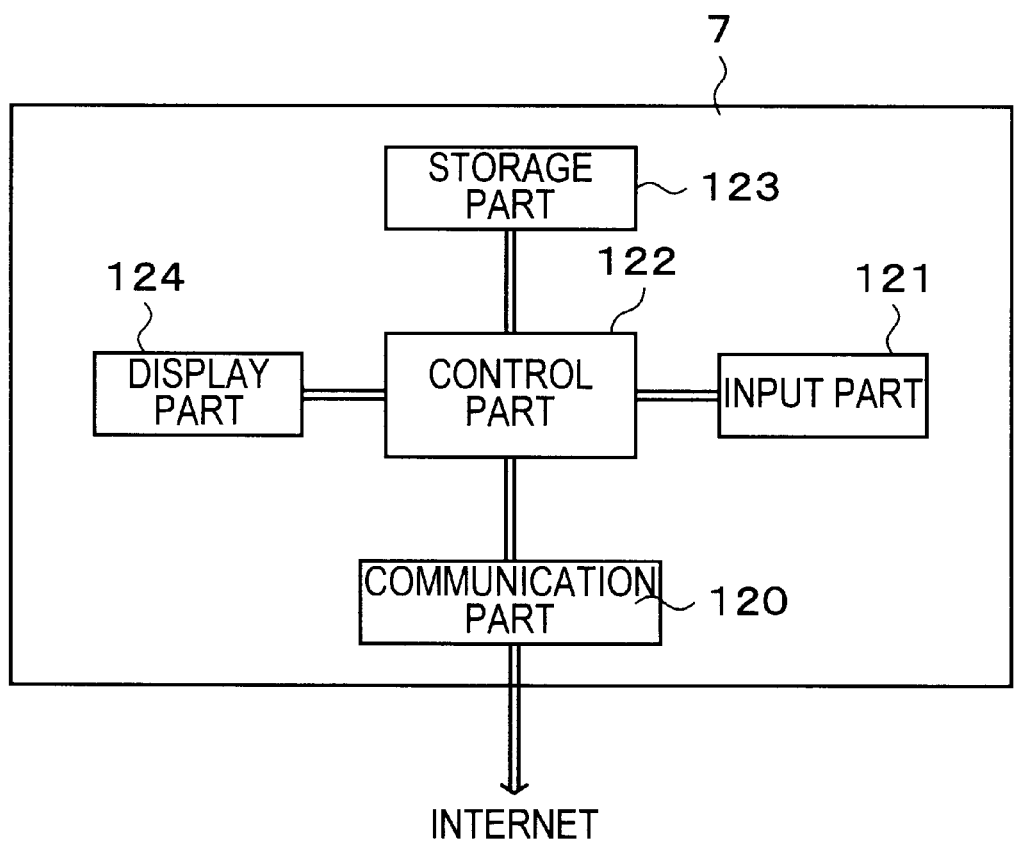
FIG. 10 is an explanatory view showing the structure of a host computer.

Next, the host computer 7 on the vendor 6 side will be explained. The host computer 7 manages the coating and developing systems M1 to Mn on the factory 2 side from a distant place. The host computer 7 has, for example, a communication part 120, an input part 121, a control part 122, a storage part 123, and a display part 124 as shown in FIG. 10.

The communication part 120, which is connected to the Internet 8, can transmit the information collection signal to the AGC 4 via the Internet 8. The communication part 120 can also receive the accumulated information on the coating and developing systems M1 to Mn which is transmitted from the AGC 4. Moreover, it can supply the management information derived based on the obtained accumulated information to the coating and developing system M1 and so on via the Internet 8 and the AGC 4.

The input part 121 is used when the manager on the vendor 6 side inputs, when necessary, the management information and so on such as the kind of the information to be collected, setting of timing, a countermeasure for a poor condition, and so on. As the input part 121, for example, a pointing device such as a keyboard and a mouse provided with a cursor key, a numerical input, and so on is used, and the input part 121 can output to the control part 122 a press signal of a pressed key on the keyboard and a position signal of the mouse.

The control part 122, which controls the entire host computer 7, reads and executes the programs stored in the storage part 123 according to various kinds of the signals from the AGC 4, the input part 121, and so on. It can also cause the result derived from the execution of this program to be stored in a predetermined region of the storage part 123 and cause the result to be outputted to the display part 124. As the control part 122, for example, a CPU or the like is usable.

In the storage part 123, stored are an information collection signal transmission program which periodically transmits the information collection signal for collecting the accumulated information on, for example, the coating and developing system M1, an accumulated information display program which displays the obtained accumulated information on the display part 124 and notifies it to the manager or the like on the vendor 6 side, a management information transmission program which transmits a countermeasure and so on derived from the accumulated information to the factory 2 side, and so on. The storage part 123 is constituted of a semiconductor memory, for example, a flash ROM or the like.

The display part 124 displays the aforesaid accumulated information and so on to the manager or the like on the vendor 6 side, and as the display part 124, for example, a color liquid crystal display cell of a dot matrix type, a CRT (Cathode Ray Tube), or the like is usable.

Next, the operation of the managing system 1 as configured above will be explained. First, an information accumulation process of the coating and developing system M1 constituting the managing system 1 will be explained along with steps of the photolithography process carried out in the coating and developing system M1.

In the coating and developing system M1, one unprocessed wafer W is taken out from the cassette C of the cassette station 20 and carried to the extension unit 62 which belongs to the third processing unit group G3. Next, the wafer W is carried to the adhesion unit 61 by the main carrier unit 30 and undergoes adhesion processing. After the adhesion processing, the wafer W is carried to the cooling unit 60, and after cooled to a predetermined temperature, is carried to, for example, the resist coating unit 31.

The gas which is adjusted to a predetermined temperature and humidity is supplied into the resist coating unit 31 from the supply pipe 43 to adjust the inside of the resist coating unit 31 to a predetermined temperature and humidity. The temperature and humidity are adjusted at this time in such a manner that the temperature and humidity of the inside of the casing 31a is detected by the temperature/humidity sensor 44 and the second control part 81 of the control section 26 controls the temperature/humidity adjusting section 48 based on this detected value.

Meanwhile, the wafer W carried to the resist coating unit 31 is held on the spin chuck 40 by suction and rotated at a predetermined rotation speed by the drive section 45. A predetermined flow rate of the resist solution is supplied to the resist discharge nozzle 42 and the resist solution is discharged onto the center of the wafer W from the resist discharge nozzle 42. Thereby, the resist solution is diffused over the entire surface of the wafer W and a resist film with a predetermined film thickness is formed on the wafer W. The wafer W on which the resist film is formed in the resist coating unit 31 is carried to the pre-baking unit 63, the extension and cooling unit 65 in sequence by the main carrier unit 30 and further carried to the edge exposure unit 70 and the aligner (not shown) in sequence by the wafer carrier 69 to undergo predetermined processing in each of the units and so on. Then, the wafer W after undergoing the exposure processing is carried to the extension unit 66 by the wafer carrier 69, and thereafter, carried to the post-exposure baking unit 67, the cooling unit 64, the developing unit 32, the post-baking unit 68, and the cooling unit 60 in sequence by the main carrier unit 30 to undergo predetermined processing in each of the units. Thereafter, the wafer W is returned to the cassette C via the extension unit 62 to finish a series of the photolithography process.

Such series of the coating and developing treatment is controlled by the control box 82 of the control section 26 as previously described. At this time, control signals of the first control part 80 and the second control part 81 of the control box 82 are outputted to the data box 83 via the information line 89 and the aforesaid information on each of the units and so on is stored in each of the accumulation regions of the accumulation part 100. As for the resist coating unit 31, for example, trace data on the temperature and humidity inside the resist coating unit 31, trace data on the rotation speed of the wafer W, trace data on the discharge flow rate of the resist solution, and so on are stored in the accumulation region of the accumulation part 100 which is allotted for the resist coating unit 31. Note that, as for the other coating and developing systems M2 to Mn, each kind of information is similarly accumulated in each of the coating and developing systems M2 to Mn.

Figure 11:
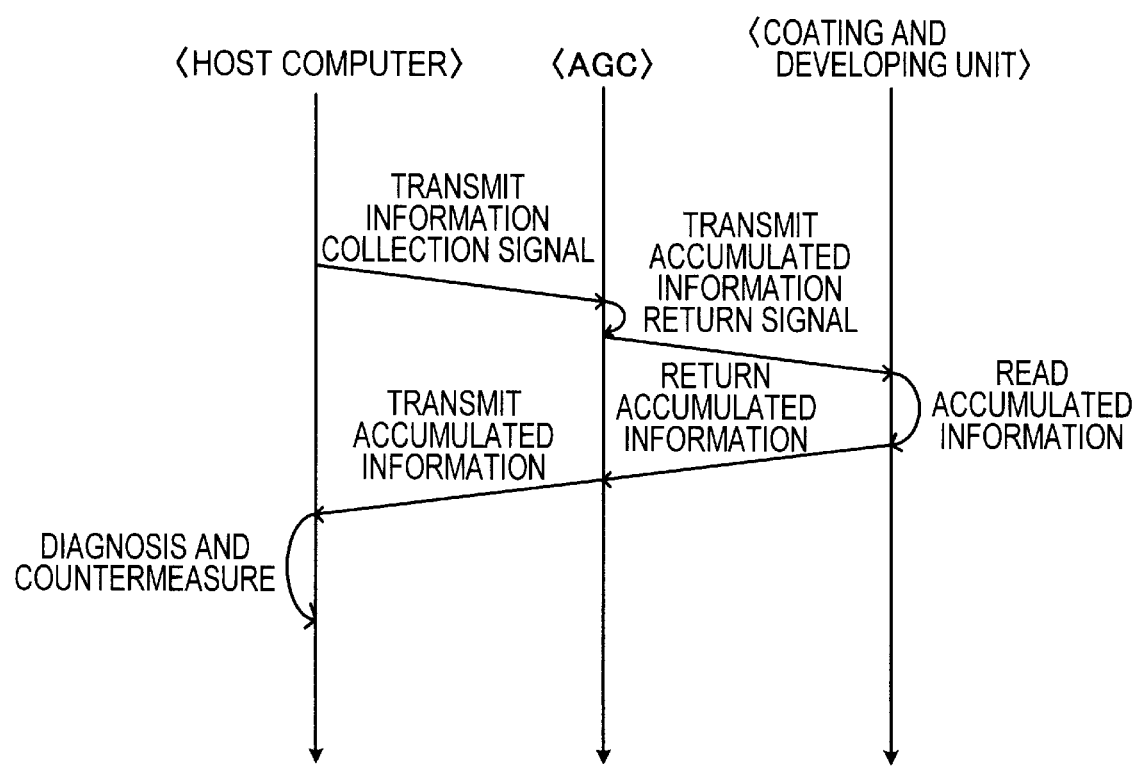
FIG. 11 is a protocol flow of the managing system.

Next, the explanation will be given on the process in the entire managing system 1 having the coating and developing systems M1 to Mn in which the information on each of the units and so on is thus accumulated. FIG. 11 is a protocol flow in the managing system 1.

Before the management by the managing system 1 is performed, the manager on the vendor 6 side inputs in advance to the input section 121, for example, an identification number of the coating and developing system which is an object of the information collection, an output time interval of the information collection signal, the name of the unit or the like which is an object of the information collection, detailed information name inside this unit, and so on. Note that these settings can be changed when necessary. The case of the management in which predetermined information on the resist coating unit 31 of the coating and developing system M1 is collected at a predetermined interval, for example, every 10 minutes will be explained below.

While the coating and developing system M1 is in operation, the information collection signal transmission program is executed in the control part 122 of the host computer 7 and the information collection signal is transmitted to the AGC 4 via the Internet 8 every 10 minutes.

The AGC 4 receiving the information collection signal confirms the identification number of the coating and developing system, the name of the unit, and so on from this information collection signal and transmits the accumulated information return signal to the data box 83 of the coating and developing system M1.

When the data box 83 receives the accumulated information return signal, the signal transmission program of the data box 83 is executed, and the information on the resist coating unit 31 which is stored in the predetermined accumulation region of the accumulation part 100, for example, the trace data on the temperature and humidity, the trace data on the rotation speed of the wafer W, the trace data on the discharge flow rate of the resist solution, and so on are read. Then, the accumulated information on the aforesaid resist coating unit 31 is returned to the AGC 4 from the communication part 103.

The accumulated information collected in the AGC 4 is transmitted from the AGC 4 to, for example, the computer 5 on the factory 2 side and the host computer 7 on the vendor 6 side.

Figure 12:
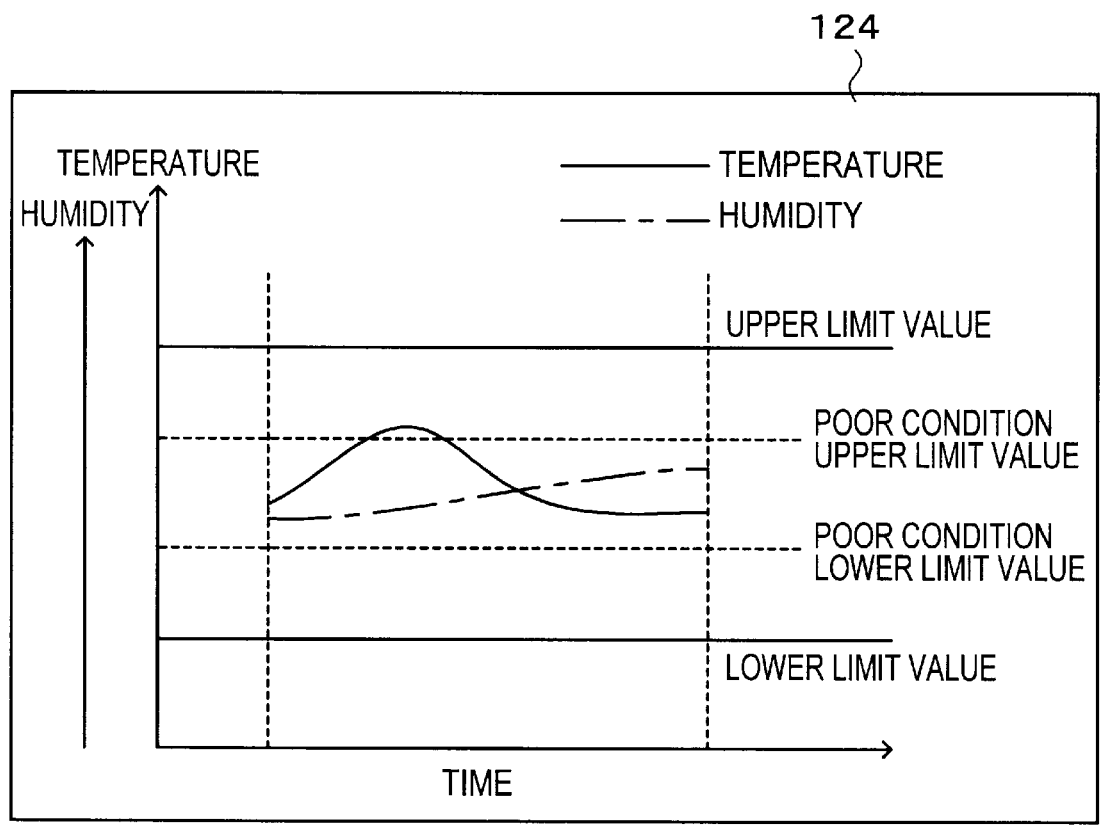
FIG. 12 is an explanatory view showing a display example of accumulated information which is displayed on a display part.

The accumulated information received in the host computer 7 via the Internet 8 is stored, for example, in the storage part 123 and at the same time displayed on the display part 124 by a predetermined method. For example, the trace data on the temperature and humidity of the resist coating unit 31 in a predetermined period is displayed as shown in FIG. 12. Then, the manager on the vendor 6 side diagnoses the condition of the temperature and the humidity of the resist coating unit 31 which is displayed on this display part 124 and judges whether a poor condition exists or not. For example, a poor condition upper limit value which is lower than an upper limit value of the temperature and the humidity and a poor condition lower limit value which is higher than a lower limit value are set in advance, and when the aforesaid trace data exceeds the poor condition upper limit value and the poor condition lower limit value, it is judged that the poor condition exists.

When it is judged that the poor condition exists, the manager notifies a person in charge of process or an engineer who is a manager on the factory 2 side of a countermeasure for avoiding the occurrence of a trouble, for example, the change of setting of the temperature and the humidity. As the means of communication for this, for example, telephone, facsimile, e-mail, and so on are used. When the manager on the vendor 6 side can directly correct the poor condition via the Internet 8, the manager on the vendor 6 side transmits the management information based on the countermeasure for this to the AGC 4. The AGC 4 receiving this management information transmits this management information to the first control part 80 via the LAN 9 to change the setting and so on of the resist coating unit 31 via the second control part 81. Thereby, the poor condition is solved so that the trouble can be avoided and the wafer W is processed at a more preferable temperature and humidity. As other countermeasures at the time when the poor condition exists, exchange of parts, addition of parts, cleaning, software change, and so on are performed.

Meanwhile, when it is judged that no poor condition exists, the unit is left as it is and the diagnosis on other information is made subsequently. At this time, the fact that no poor condition exists may be notified to the manager on the factory 2 side.

According to the managing system 1 described in the above embodiment, sufficient information is obtainable via the Internet 8 so that the manager on the vendor 6 side can appropriately manage the coating and developing systems M1 to Mn on the factory 2 side from a distant place without visiting the site where the poor condition exists. Consequently, the poor condition can be quickly handled without the necessity of the manager on the vendor 6 side visiting the factory 2 side. Furthermore, the By information on the coating and developing systems M1 to Mn is obtained and diagnosed periodically so that the poor condition which is a premonitory sign of the trouble can be detected and handled in advance before the trouble occurs.

The AGC 4 is disposed on the factory 2 side, the AGC 4 and the plural coating and developing systems M1 to Mn are connected, and the information on the coating and developing systems M1 to Mn is collected so that the information on the plural coating and developing systems M1 to Mn can be easily obtained by connecting the host computer 7 on the vendor 6 side and the AGC 4.

In the above-described embodiment, the example of collecting the information on the resist coating unit 31 is described, but other accumulated information on the coating and developing system M1 may of course be collected. Moreover, the kind, the number, the timing, the accumulation period, and so on of the collected accumulated information can be selected freely.

In the above-described embodiment, in the case when the poor condition is not solved only by the presentation of the countermeasure and so on to the manager on the factory 2 side by the manager on the vendor 6 side and in other cases like this, the manager on the vendor 6 side needs to visit the factory 2. In such a case, the manager on the vendor 6 side may handle the poor condition using, for example, a PC (Personal Computer) which can be connected to the LAN 9 on the factory 2 side and can communicate with the AGC 4. Incidentally, as the PC, one having an ordinary function is used.

In this case, the manager on the vendor 6 side visiting the factory 2 side first connects the PC to the LAN 9 outside the clean room R to enable the communication with the AGC 4.

Then, the manager on the vendor 6 side inputs the management information for handling the poor condition to the PC, referring to the information which has been already obtained, information obtained at the site, and so on, and the management information is transmitted to the AGC 4. The management information transmitted to the AGC 4 is transmitted to the coating and developing system M1 by the AGC 4, and for example, the setting and so on of the resist coating unit 31 having the poor condition is corrected by the second control part 81.

In the case when the manager or the like on the vendor 6 side thus visits the factory 2 side to handle the poor condition, the manager or the like handles the poor condition from the outside of the clean room R with the use of the PC, and therefore, he/she does not have to enter the clean room R, either so that a purified atmosphere inside the clean room R is maintained. Furthermore, the manager or the like does not have to change into a clean suit or the like each time so that time and labor are saved and quick handling is made possible.

In the above-described embodiment, the conditions of the coating and developing systems M1 to Mn are diagnosed by the manager on the vendor 6 side, but they may be diagnosed automatically by the host computer 7 when possible. For example, the poor condition information on a symptom and so on indicating a premonitory sign of a trouble which occurred in the past and a countermeasure for the poor condition are registered in the storage part 123 of the host computer 7. Further, the storage part 123 is provided with an auto-diagnosis program. This auto-diagnosis program compares the obtained accumulated information on the coating and developing systems M1 to Mn with the aforesaid poor condition information, and when information identical to the accumulated information exists in the poor condition information, it judges that the poor condition exists and presents a countermeasure for the poor condition.

Figure 13:
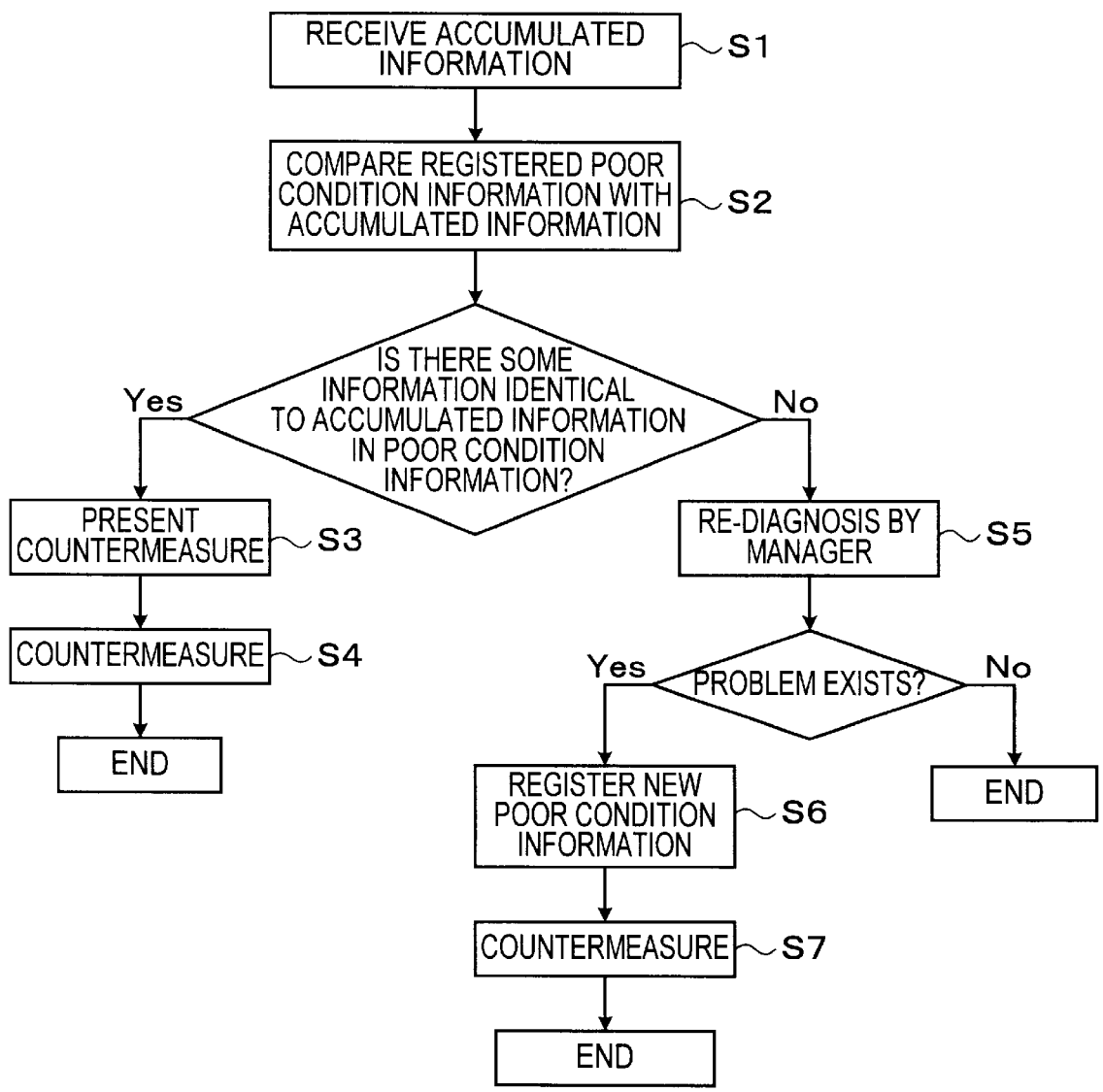
FIG. 13 is a flow showing the operation of the host computer having an auto-diagnosis program.

FIG. 13 is a chart showing the operation of the host computer 7 having the auto-diagnosis program. When the host computer 7 receives the accumulated information (S1), the auto-diagnosis program is executed and the conditions of the coating and developing systems M1 to Mn are automatically diagnosed. Specifically, the obtained accumulated information and the registered poor condition information are compared (S2), and when the information corresponding to the symptom of the coating and developing systems M1 to Mn based on the accumulated information exists in the poor condition information, it is judged that the poor condition exists and the countermeasure for this is displayed, for example, on the display part 124 (S3). Thereafter, for example, the manager on the vendor 6 side notifies this to the person in charge of process or the engineer on the factory 2 side and the poor condition is handled by this person in charge of process or the like (S4).

Meanwhile, when no information in the poor condition information is identical to the accumulated information and it is judged that no poor condition exists, the accumulated information is notified to the manager, for example, by means of the display part 124, and re-diagnosis is made by, for example, the manager (S5). At this time, when the diagnosis that the poor condition exists is made for the first time by the manager, this accumulated information is registered in the storage part 123 (S6) and the poor condition information is updated. After the manager judges that the poor condition exists, it is notified to the manager or the like on the factory 2 side and the poor condition is handled as described above (S7).

The host computer 7 thus automatically makes the diagnosis and presents its countermeasure so that the manager or the like can take a uniform and appropriate measure for the poor condition based on the past experience. Moreover, the poor condition information is updated each time a new poor condition occurs so that an auto-diagnosis function of the host computer 7 is enhanced.

Incidentally, after the host computer 7 automatically presents the countermeasure, the host computer 7 itself may transmit the information to the computer 5 on the factory 2 side via the Internet 8 and notify it to the manager on the factory 2 side. Moreover, it is also suitable that the host computer 7 transmits the management information on the presented countermeasure to the AGC 4 and the AGC 4 transmits the management information to the coating and developing systems M1 to Mn to automatically handle the poor condition. In this case, the manager does not have to handle the poor condition and a trouble and so on can be automatically avoided.

In the above-described embodiment, the information on each of the coating and developing systems M1 to Mn is only periodically collected, but the trouble information may be collected in accordance with the trouble occurrence in the coating and developing systems M1 to Mn.

Figure 14:
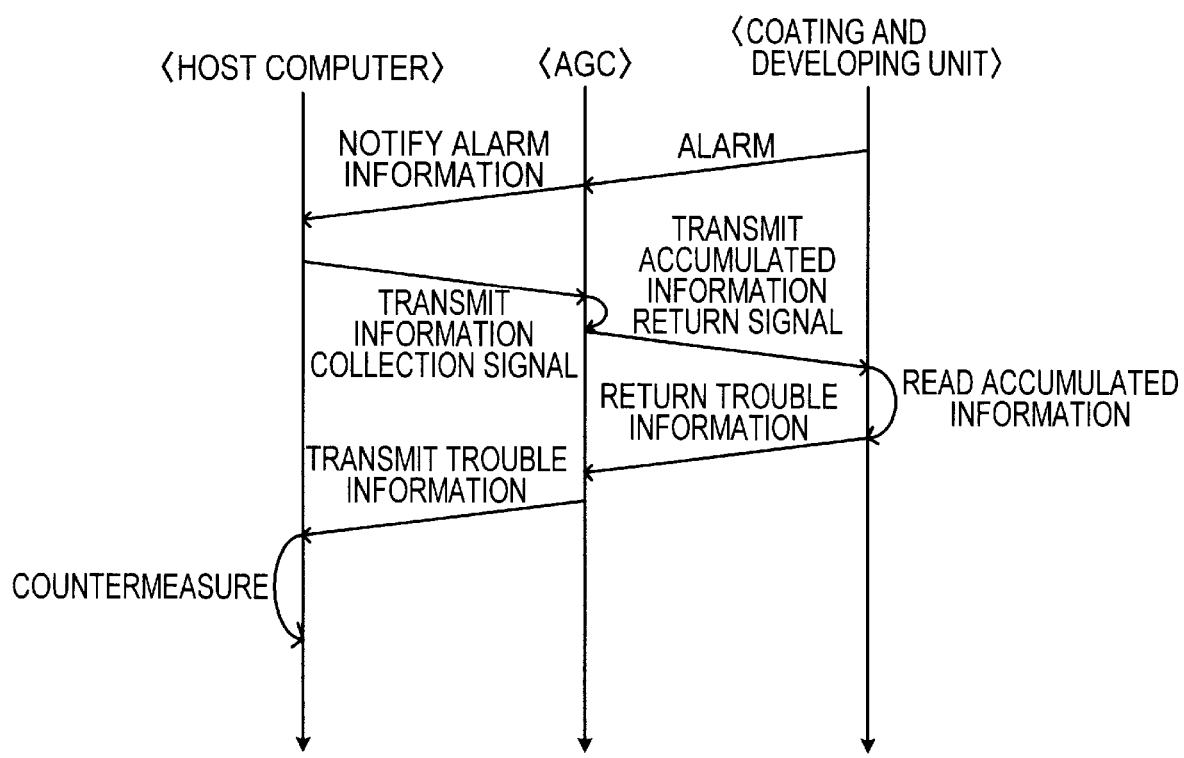
FIG. 14 is another protocol flow of the managing system.

In this case, for example, the coating and developing systems M1 to Mn are provided with an alarm function of detecting the trouble occurrence. Further, for example, the AGC 4 is provided with a notifying unit for notifying the vendor 6 side of alarm information on the trouble. The notifying unit is a communication unit for notifying the alarm information to the host computer 7 for example, using the Internet 8. Hereinafter, the management process as described above will be explained, following the protocol flow in FIG. 14. Note that the trouble includes, for example, the case when a numerical value on a processing environment of the wafer W exceeds a threshold value, the case when the coating and developing system and the units are out of order, the case when the wafer W is broken or dropped, and so on.

When a trouble occurs in, for example, in the coating and developing system M1, the trouble is detected owing to the alarm function and the alarm information on this trouble is notified to the host computer 7 on the vendor 6 side and the computer 5 on the factory 2 side from the AGC 4. The host computer 7 receiving the alarm information specifies, for example, a coating and developing system, a unit, or the like in which the trouble occurs based on this alarm information and transmits the information collection signal for obtaining the information on this unit to the AGC 4.

The information collection signal is received in the AGC 4, and thereafter, a trouble information return signal is transmitted to the data box 83 of the coating and developing system M1 from the AGC 4. In the data box 83 receiving the accumulated information return signal, the accumulated information on the unit in which the trouble occurs is read and this accumulated information is returned to the AGC 4 as the trouble information. The trouble information returned to the AGC 4 is transmitted to the host computer 7 via the Internet 8 by the AGC 4. When the trouble information is received in the host computer 7, this trouble information is displayed on the display part 124 and notified to the manager on the vendor 6 side.

The handling thereafter is similar to that in the case described above in which the accumulated information is periodically collected, and may be carried out in such a manner that the manager on the vender 6 side determines the countermeasure and notifies it to the person in charge of process or the engineer on the factory 2 side, or that the host computer 7 automatically presents the countermeasure and the person in charge of process or the like handles the trouble according to the presentation. When possible, the host computer 7 may transmit the management information on the countermeasure automatically to the AGC 4 side to automatically handle the trouble.

It is also suitable that the host computer 7 obtaining the trouble information judges according to the content or the level of the trouble whether the trouble should be handled only by the manager on the factory side 2 or the judgment of the manager on the vendor 6 side is needed, and it notifies the result of the judgment to both of the managers. For example, the trouble is classified into two steps of levels in advance according to its content and level 1 is set to be handled only by the manager on the factory 2 side and level 2 is set to be handled after the manager on the vendor 6 side makes the judgment.

Then, when the trouble information is inputted to the host computer 7, the host computer 7 designates the level of the trouble, and when the trouble is designated as level 1, it is judged that the manager on the factory 2 side handles the trouble, and when the trouble is designated as level 2, it is judged that the judgment of the manager on the vendor 6 side is needed. This judgment result is notified to both of the managers. Thereby, for example, when the trouble is on a relatively low level, quick handling only by the manager on the factory 2 side is made possible without the necessity of waiting for the judgment of the manager on the vendor 6 side. Furthermore, when the trouble is on a relatively high level and cannot be sufficiently handled only by the manager on the factory 2 side, the judgment of the manager on the vendor 6 side who has a specialized knowledge can be obtained so that a more appropriate measure can be taken.

Incidentally, the aforesaid notification of the alarm information to the manager on the vendor 6 side, the manager on the factory 2 side, and so on may be given through other means, for example, telephone, facsimile, e-mail, and so on.

In the above-described embodiment, the host computer 7 determines whether the judgment of the manager on the vendor 6 side is needed or not according to the level of the trouble, but it is also suitable, for example, that the person to handle the trouble is determined in the factory 2 side where the alarm is detected based on a preset alarm level and the trouble information is transmitted to the person who is determined to be the person to handle the trouble.

For example, various kinds of possible troubles are set, being classified into the alarm levels 1 to 3 in the AGC 4 on the factory 2 side. For example, a relatively high level of trouble which is to be handled by the manager on the vendor 6 side is designated as the alarm level 1, a relatively low level of trouble which the manager on the factory 2 side may possibly be able to handle is designated as the alarm level 2, and a trouble which can surely be handled by the manager on the factory 2 side is designated as the alarm level 3.

Specifically, the alarm level 1 includes, for example, as a trouble of a transfer system, a mechanical limit error when the actual position of the carrier unit of the wafer W differs from the position of the carrier unit recognized by a control system, a system error of the transfer system when the control system related to transfer has an error, an inoperable error of carrier unit initialization when the initialization operation of the carrier unit cannot be executed, and so on. The alarm level 2 includes a carrier unit pose cancellation error when a pose command of the carrier unit cannot be cancelled, a transfer arm unmovable error when the carrier unit cannot move, a wafer protruding error when the wafer W protrudes from the carrier unit, a belt cut error when a drive belt in the carrier unit is cut while in operation, and so on. The alarm level 3 includes an area sensor detection error when an area sensor detects a predetermined object to be detected, a vacant cassette detection error when the wafer W is not in the cassette where it should be, and so on. Note that the carrier unit includes, for example, the main carrier unit 30, the wafer carrier 69, and so on mentioned in the above-described embodiment.

When the trouble occurs in the coating and developing system M1 and an alarm is generated, the alarm level is designated in the AGC 4, and when it is designated as the alarm level 1, the trouble information on this alarm is transmitted only to the host computer 7 on the vendor 6 side and notified to the manager of the vendor 6 side. The manager on the vendor 6 side who obtains the trouble information takes an appropriate measure for the trouble based on the trouble information. Incidentally, as for the countermeasure, the instruction may be given to the worker on the factory 2 side by telephone or the like as is previously described, or the management information may be transmitted via the Internet 8 to solve the trouble.

When the alarm is designated as the alarm level 2, the trouble information is transmitted, for example, to the computer 5 of the factory 2 side and the trouble is handled by the manager on the factory 2 side. Then, only when the alarm is not yet cancelled, the trouble information is transmitted to the host computer 7 on the vendor 6 side and is handled by the manager on the vendor 6 side.

When the alarm is designated as the alarm level 3, for example, the trouble information is transmitted only to the computer 5 on the factory 2 side and handled by the manager on the factory 2 side. At this time, it may be notified to the vendor 6 side that the trouble information is transmitted.

A receiving end of the trouble information is thus changed according to the content of the alarm level so that the priority in handling it can be given to the person suitable for the kind of the trouble. Furthermore, the relatively low level of trouble can be handled only by the factory 2 side without the help of the vendor 6 side so that the trouble can be more quickly solved. Moreover, as for the trouble which cannot be handled by the factory 2 side, the trouble information is transmitted to the vendor 6 side through the Internet 8 so that an appropriate measure can be taken by the manager on the vendor 6 side who has a more specialized knowledge. Incidentally, the alarm level is not limited to the levels 1 to 3, but optional steps of levels can be set.

The above-described embodiment is the managing system for the coating and developing system, but the processing system of the wafer may be other processing system, for example, the aligner, the etching unit, the examining unit, and so on. Furthermore, the embodiment is the managing system only for the coating and developing system but it may include the plural kinds of the aforesaid processing systems. Factories in a plurality of places may be managed. The managing unit on the vendor side may also be installed in a plurality of places instead of installing it in one place. The present invention is also applicable to processing systems for substrates other than the wafer, for example, an LCD substrate and a mask reticule substrate for a photo mask.

The managing system 1 described above is the managing system which performs management operation by collecting the information for solving the trouble and the poor condition, but the present invention is also applicable to a managing system which performs management operation by collecting information for the maintenance of a processing system of a substrate, and is also applicable to a managing system which collects examination information on a processed substrate and manages a processing system of the substrate based on the examination information.

According to the present invention, sufficient information can be obtained even from a distant place and quick and appropriate maintenance and management of the processing system of the substrate is made possible based on this information.

Figure 15:
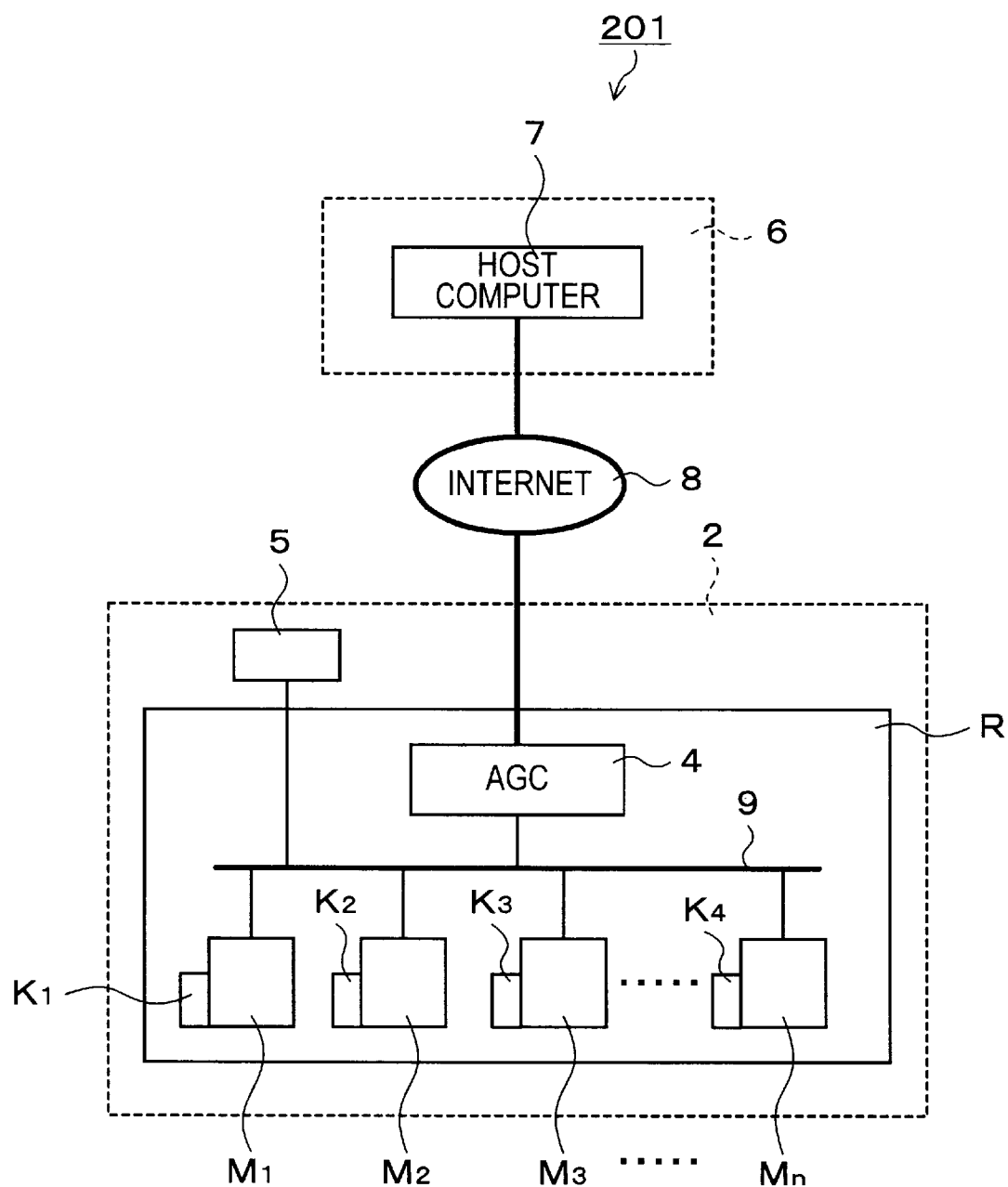
FIG. 15 is a schematic block diagram of a managing system according to another embodiment.

Next, another embodiment will be explained. FIG. 15 is a schematic block diagram of a managing system 201 according to the aforesaid another embodiment. This managing system 201 is a managing system for managing a coating and developing system as a processing system. The managing system 201 has a plurality of coating and developing systems M1 to Mn, examining units K1 to Kn, an AGC 4 as an information collecting/transmitting unit and a managing computer 5 on a factory 2 side of, for example, a wafer maker. Meanwhile, it has a host computer 7 on a vendor 6 side of a processing system maker. The coating and developing systems M1 to Mn, the examining units K1 to Kn, and the AGC 4 are installed in a clean room R inside the factory 2 and the managing computer 5 is installed outside of the clean room R inside the factory 2.

The structure of the coating and developing systems M1 to M2 is the same as that in the above-described embodiment, and the examining unit K1 is disposed on a rear side of a processing station 21 as shown by a broken line in FIG. 15.

Figure 16:
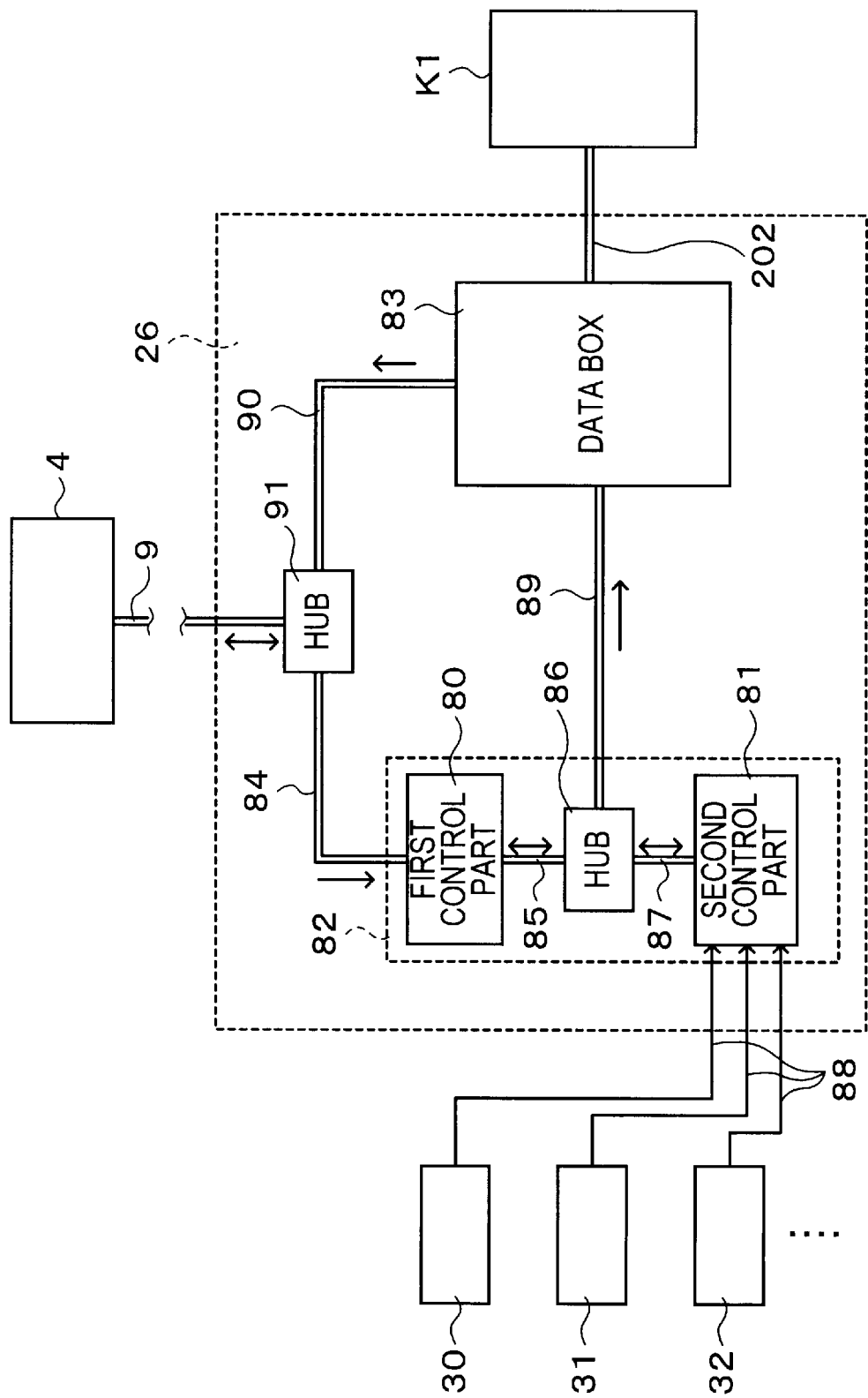
FIG. 16 is a block diagram showing the structure of a control section.
Figure 17:
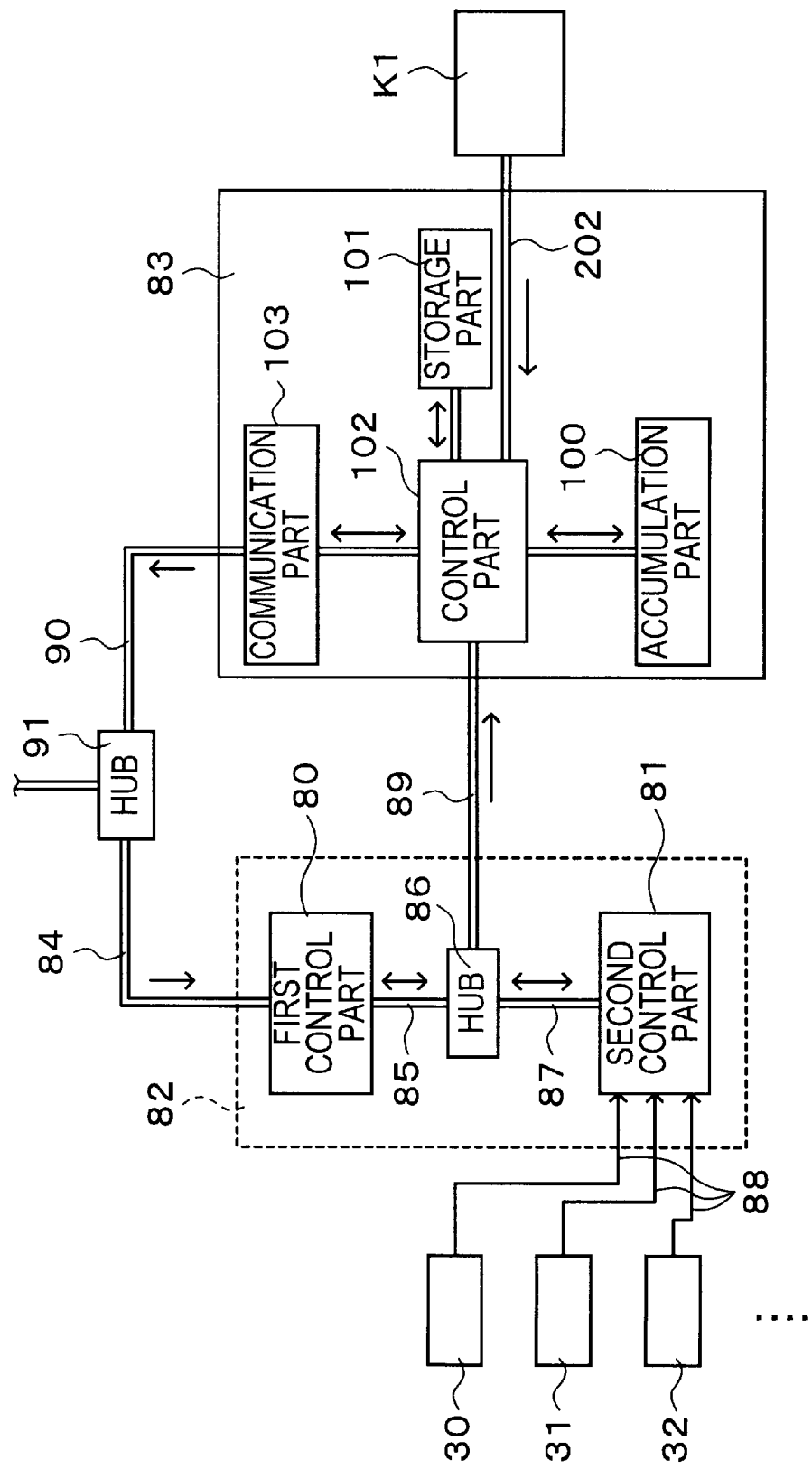
FIG. 17 is a block diagram showing the structure of a data box.

As shown in FIG. 16, a control section 26 in this embodiment has a control box 82 composed of a first control part 80 and a second control part 81, a data box 83 as an information accumulation section. The data box 83 accumulates therein information transmitted/received between the first control part 80 and the second control part 81 and examination information of the examining unit K1. In other words, the data box 83 is connected to the examining unit K1 by an information line 202 and the examination information on a wafer W which is examined in the examination unit K1 is outputted to the data box 83. In this embodiment, the information outputted from the first control part 80, the second control part 81, and the examining unit K1 is accumulated in an accumulation part 100 as shown in FIG. 17. The information from the first control part 80 is, for example, control information relating to the control of the entire coating and developing system M1, the information from the second control part 81 is control information and detected information on each of units, for example, a main carrier unit 30, resist coating units 31, 33, developing units 32, 34, and so on, and the information from the examining unit K1 is detected information on the wafer W examined in the examining unit K1. The accumulation part 100 has a plurality of accumulation regions so that the inputted information can be accumulated therein, being classified by the kind of the information, and each kind of the above information is accumulated separately in each of the regions.

In a storage part 101, stored are an information accumulation program which causes the information received from the first control part 80, the second control part 81, and the examining unit K1 to be classified according to the kind of the information and causes the information to be accumulated in the predetermined accumulation regions of the accumulation part 100, an information transmission program which takes out predetermined information from the accumulation region to transmit it to the AGC 4, and so on. A control part 102, when receiving the information from the first control part 80, the second control part 81, and the examining unit K1, reads and executes the information accumulation program from the storage part 101. It also reads and executes the information transmission program from the storage part 101, for example, according to the information return signal from an AGC 4, as described before.

Figure 18:
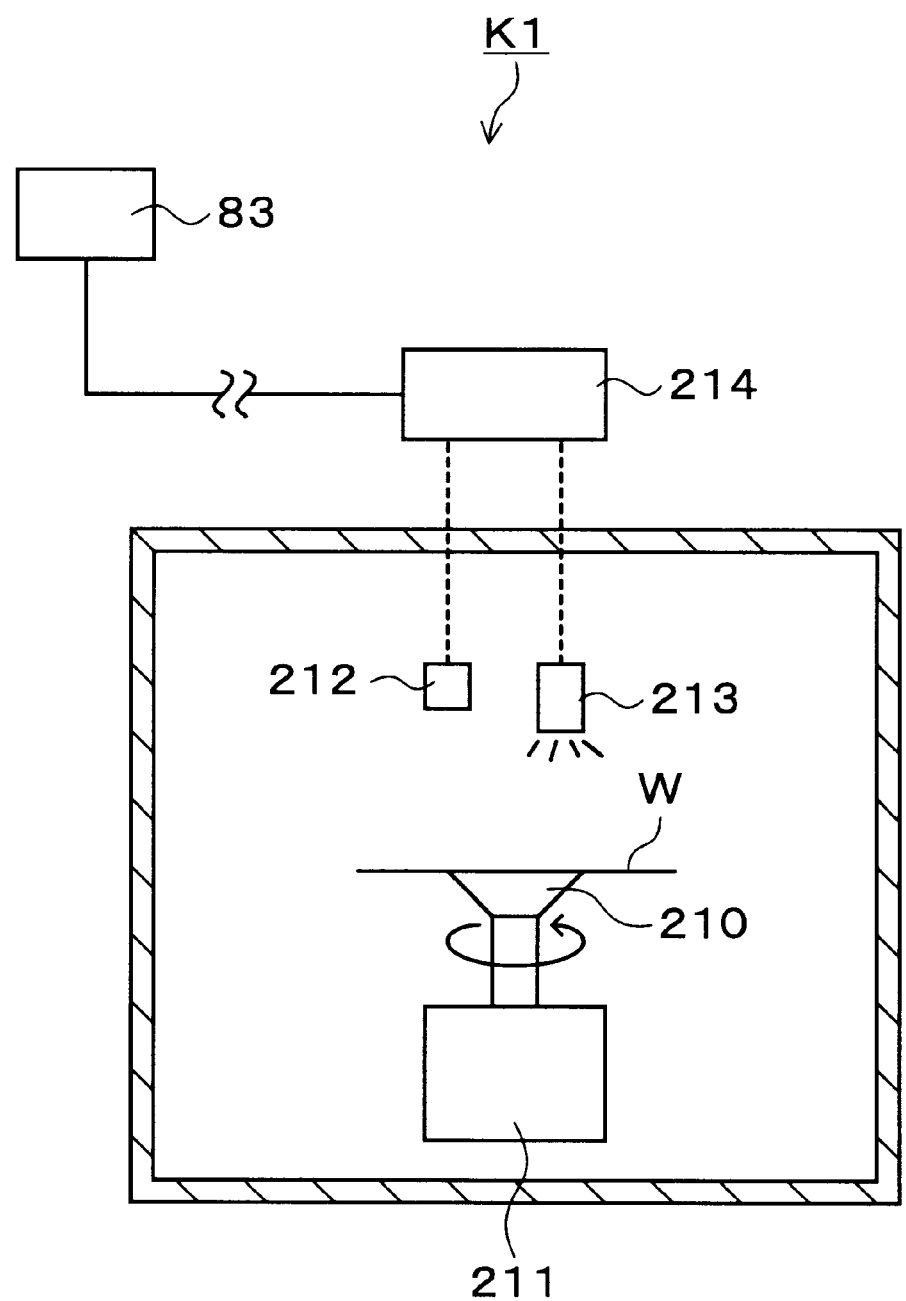
FIG. 18 is an explanatory view showing the outline of an examining unit.

Next, the examining unit K1 will be explained. The examining unit K1 is an examining unit which photographs the surface of the wafer W having undergone, for example, a series of developing treatment and examines a macro defect of the wafer W. As shown in FIG. 18, the examining unit K1 is provided with, for example, a mounting table 210 for sucking and holding the wafer W. A rotation drive mechanism 211 is provided under the mounting table 210 and this rotation drive mechanism 211 is provided with, for example, a servo motor or the like which can control the rotation angle of the mounting table 210. Therefore, the wafer W mounted on the mounting table 210 can be rotated at predetermined timing by a predetermined angle.

Above the mounting table 210, for example, a CCD camera 212 for photographing the upper surface of the wafer W and a stroboscope 213 which serves as its light source are provided. These CCD camera 212 and stroboscope 213 are both disposed to face the surface of the wafer W which is sucked and held on the mounting table 210. Thereby, a predetermined area of the upper surface of the wafer W can be photographed. Further, when the wafer W is rotated to change a photographed area, the entire surface of the wafer W can be finally photographed.

The CCD camera 212 and the stroboscope 213 are controlled by a control unit 214. The examining unit K1 is connected to the control box 83 by the information line 202 as described above and the examination information which is photograph data by the CCD camera 212 is outputted to the control box 83 via the control unit 214.

Figure 19:
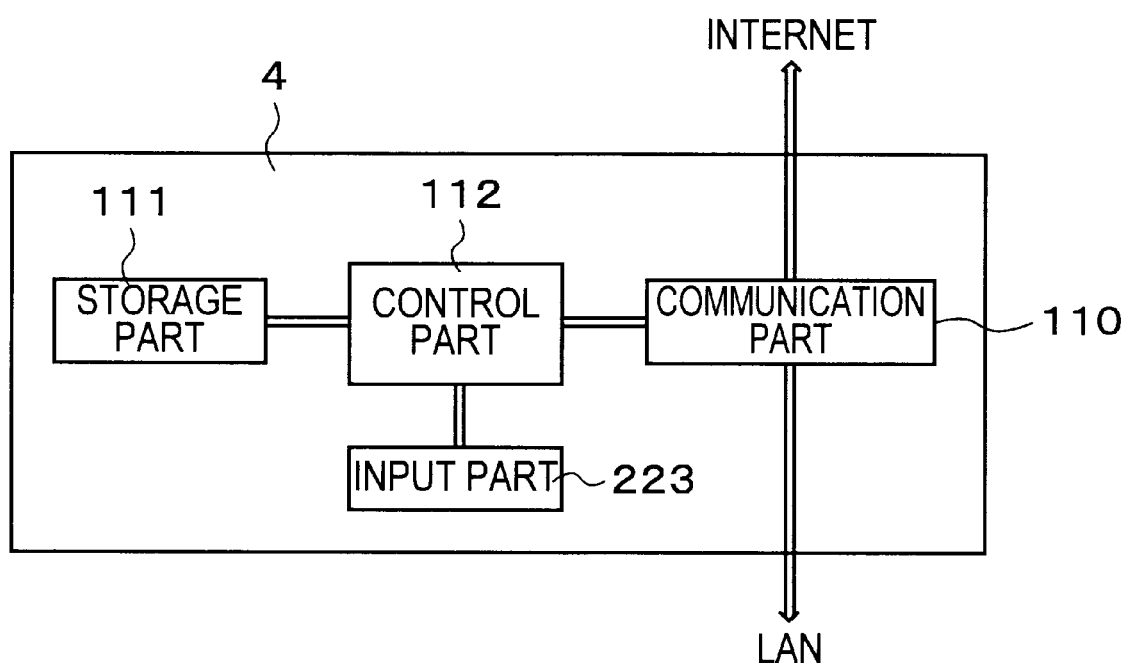
FIG. 19 is an explanatory view showing the structure of an AGC in the aforesaid another embodiment.

Next, the AGC 4 adopted in this embodiment will be explained. The AGC 4 is composed of, for example, a communication part 110, a storage part 111, a control part 112, and an input part 223 as shown in FIG. 19. As the input part 223, a touch panel or the like is used.

The communication part 110, which is connected to a LAN 9, can transmit/receive various kinds of signals, information, and so on to/from a managing computer 5 in a factory 2 and the coating and developing systems M1 to Mn. The communication part 110, which is connected also to the Internet 8, can transmit/receive information to/from a host computer 7 on a vendor 6 side.

In the storage part 111, stored is, for example, an information collection/transmission program for periodically collecting predetermined examination information accumulated in each of the coating and developing systems M1 to Mn and transmitting it to the host computer 7 of the vendor 6. Besides, other information collection/transmission programs, for example, for collecting predetermined information in the data box 83 in response to a demand and transmitting it to the host computer 7 are also stored.

The control part 112 reads and executes the information collection/transmission program and so on. Therefore, for example the examination information accumulated in the data box 83 of the coating and developing systems M1 to Mn is periodically collected in the AGC 4 and transmitted to the host computer 7. The AGC 4 can communicate with each of the coating and developing systems M1 to Mn so that it can collectively control each of the coating and developing systems M1 to Mn.

Next, the operation of the managing system 201 as configured above will be explained.

Figure 20:
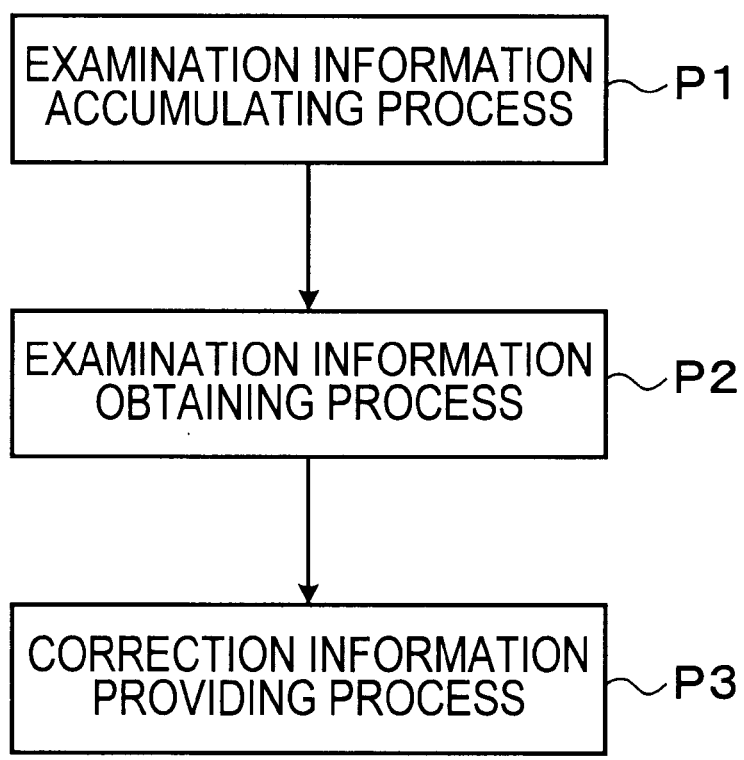
FIG. 20 is an explanatory view showing a process of the managing system.

As shown in FIG. 20, the operation of the managing system 201 is mainly classified into an examination information accumulating process P1, an examination information obtaining process P2, and a correction information providing process P3.

First, the examination information accumulating process P1 of accumulating the examination information on the wafer W in, for example, the coating and developing system M1 will be explained along with the steps of the photolithography process carried out in the coating and developing system M1, with reference also to FIG. 1 to FIG. 3 which are explained before.

One unprocessed wafer W is taken out from a cassette C of a cassette station 20 in the coating and developing system M1 and is carried to an extension unit 62 which belongs to a third processing unit group G3. Next, the wafer W is carried to an adhesion unit 61 by a main carrier unit 30 to undergo adhesion processing. After the adhesion processing, the wafer W is carried to a cleaning unit 60, and after cooled to a predetermined temperature, it is carried to a resist coating unit 31 and a resist film is formed on the surface of the wafer W.

The wafer W on which the resist film is formed is carried to a pre-baking unit 63, an extension and cooling unit 65 in sequence by a main carrier unit 30, and further carried to an edge exposure unit 70 and an aligner (not shown) in sequence by a wafer carrier 69 to undergo predetermined processing in each of the units and so on. Then, the wafer after undergoing exposure processing is carried to the extension unit 62 by the wafer carrier 69, and thereafter, is carried to a post-exposure baking unit 57, a cooling unit 54, a developing unit 32, a post-baking unit 68, and the cooling unit 60 in sequence by the main carrier unit 30 to undergo predetermined processing in each of the units. Thereafter, the wafer W is returned to the extension unit 62 and carried to the examining unit K1 by a wafer carrier 24.

The wafer W carried to the examining unit K1 is mounted on the mounting table 210 and aligned. Thereafter, the stroboscope 213 is caused to emit light and the surface of the wafer W is photographed by the CCD camera 212. A predetermined area of the surface of the wafer W is photographed by one photographing. After each photographing, the wafer W is rotated by a predetermined angle so that the entire surface of the wafer W is finally photographed. Image data on the wafer W obtained by this photographing is outputted to the data box 83 of the coating and developing system M1 from the control unit 214 as the examination information. The examination information outputted from the data box 83 is stored and accumulated in a predetermined region of the accumulation part 100.

The wafer W after being examined is returned to the cassette C by the wafer carrier 24 so that a series of the photolithography process is finished.

Meanwhile, the coating and developing system M1 and each of the units in operation are controlled by the first control part 80 and the second control part 81 of the control section 26 as described above, and the control information and the detected information on the coating and developing system M1 and each of the units are outputted to the data box 83 from the first control part 80 and the second control part 81 via an information line 89. The control information and the detected information outputted to the data box 83 are stored and accumulated in predetermined regions of the accumulation part 100. Note that the examination information is accumulated similarly in the coating and developing systems M2 to Mn.

Figure 21:
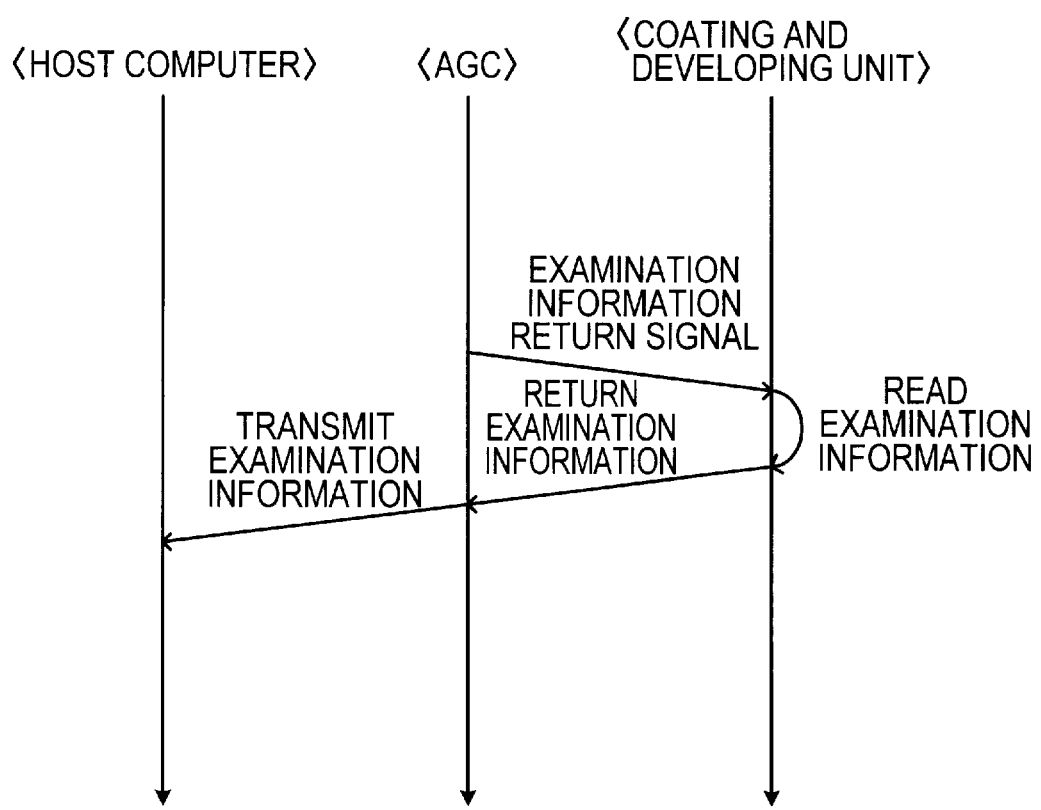
FIG. 21 is a protocol flow of an examination information obtaining process of the managing system.

Next, the examination information obtaining process P2 for obtaining the examination information accumulated in, for example, the coating and developing system M1, as described above will be explained. FIG. 21 is a protocol flow of the examination information obtaining process P2 of the managing system 201.

For example, while the coating and developing system M1 is operated, the information collection/transmission program is executed in the control part 112 of the AGC 4 and an examination information return signal is periodically outputted to each of the coating and developing systems M1 to Mn from the AGC 4. The information transmission program in the data box 83 is executed and the examination information stored in a predetermined accumulation region of the accumulation part 100 is read in, for example, the coating and developing system M1 receiving this examination information return signal. The examination information at this time may be all the information accumulated or may be a part of the information which is designated. Then, the examination information which is, for example, image data on the wafer W is returned to the AGC 4 from the communication part 103 of the data box 83.

The examination information thus collected in the AGC 4 is transmitted to the host computer 7 on the vendor 6 side via the Internet 8 from the AGC 4. Thereby, the host computer 7 obtains the examination information. Incidentally, the examination information collected in the AGC 4 may be stored and accumulated in the AGC 4. The examination information and so forth on the other coating and developing systems M2 to Mn are similarly collected and transmitted by the AGC 4 to be received by the host computer 7.

Next, the correction information providing process P3 will be explained. For example, the examination information received in the host computer 7 is displayed on a display part 134 by a predetermined method and notified to a manager on the vendor 6 side. The manager on the vendor 6 side who obtains the examination information evaluates the processing condition of the wafer W based on the examination information, for example, the image data on the wafer W. Then, when the manager on the vendor 6 side detects a poor condition in this processing condition, for example, the manager on the vendor 6 side specifies a processing unit, a part, and so on which are the causes of the poor condition based on the examination information and thinks of a solving method and so on for the poor condition.

At this time, when necessary, the transmission of the control information on the processing units and so on accumulated in the data box 83 of the coating and developing system M1 is demanded and obtained through the Internet 8. Such information is obtained, for example, by having the AGC 4 collect and transmit the control information and so on similarly to the examination information.

Thereafter, the method for solving the poor condition and so on thought of by the manager on the vendor 6 side is notified to a manager on a factory 2 side as the management information. This notification of the managing information is carried out in such a manner, for example, that the manager on the vendor 6 side inputs the management information to the host computer 7 and the management information is transmitted to the managing computer 5 on the factory 2 side from the host computer 7. Incidentally, the management information may be notified by other means, for example, telephone and facsimile.

The manager on the factory 2 side receiving the management information corrects a portion having the poor condition of the coating and developing system M1 according to the management information. The correction is made, for example, by transmitting correction data to the coating and developing system M1 using the managing computer 5 and changing its setting and so on. The correction may also be made in such a manner that the manager or the like on the factory 2 side inputs the correction data to the input part 223 of the AGC 4 to have the AGC 4 correct the coating and developing system M1. Further, the correction may also be made in such a manner that the manager on the factory 2 side directly operates the coating and developing system M1.

In the above-described embodiment, the examination information on the wafer W which is examined in the examining unit K1 is obtained by the host computer 7 through the Internet 8 so that the manager well informed of specialized knowledge on the vendor 6 side can obtain the detailed examination information quickly. Therefore, the processing condition of the wafer W can be checked in detail. Further, when the poor condition is detected, a more appropriate solving method and so on can also be thought of based on the detailed examination information and can be presented to the manager on the factory 2 side. Therefore, it is possible to take a quick and appropriate measure for the poor processing condition of the wafer W.

Further, the data box 83 is provided in the coating and developing system M1 and the examination information is accumulated in it so that predetermined examination information can be obtained at a desired time. Thereby, the examination information can be periodically obtained. Each of the examination information on the coating and developing systems M1 to Mn is collected by the AGC 4 so that the examination information can be collectively transmitted to the vendor 6 side and the entire structure of the managing system 201 can be simplified.

In the examination information accumulating process P1 in the above-described embodiment, the accumulated examination information is the image data on the wafer W, but it may be other examination information, for example, data on the film thickness of a resist film, bubble sensor data indicating the detection of bubbles occurring on the wafer W, data on the line width of a circuit pattern which is finally formed on the wafer W, overlay data indicating the detection of deviated overlay of the circuit pattern by exposure, or other data, or it may be the examination data in which the plural pieces of the above data are combined. In this case, a plurality of examining units may be provided separately in the factory 2 or the examining unit K1 may collectively examine the other items.

In the examination information obtaining process P2 in the above-described embodiment, the host computer 7 periodically obtains the examination information, but the examination information may be obtained when a poor condition occurs in the coating and developing system M1. In this case, an alarm notifying function of notifying the occurrence of the poor condition to the AGC 4 is provided, for example, in the coating and developing system M1. When the poor condition occurs in the coating and developing system M1, an alarm notification is transmitted to the AGC 4 and the information collection/transmission program is executed in the AGC 4 receiving the alarm notification. Thereby, the examination information is collected and transmitted to the host computer 7 similarly to the aforesaid embodiment.

Thereafter, the manager on the vendor 6 side who obtains the examination information considers a solving method and so on for the poor condition based on the examination information, and a selected solving method and so on are notified to the manager on the factory 2 side as the management information. This enables the manager on the factory 2 side to take an appropriate measure based on the management information thought of by the manager who is a specialist on the vendor 6 side, and the poor condition can be solved quickly and appropriately. Incidentally, such examination information obtaining process at the time when the poor condition occurs may proceed along with the aforesaid examination information obtaining process which is periodically carried out.

The examination information may be obtained at the time of periodical check-ups of the coating and developing systems M1 to Mn, at the time when the coating and developing systems M1 to Mn are installed, or at the time when they start to operate. In this case, for example, position sensor data on the wafer W in the resist coating units 31, 33, data on the number of operation times, data on the speed of each of drive systems, position sensor data on the wafer W in units of a heating system, for example, the post-exposure baking unit 67, and so on are obtained as the examination information.

Furthermore, the control information, the detected information, and so forth on a predetermined unit in the coating and developing systems M1 to Mn may be obtained as the examination information. For example, data on the exhaust pressure, image data on a mist trap for removing mist, data on the pressure of a tank which is a supply source of a resist solution, and image data on a resist solution discharge nozzle in the resist coating units 31, 33; data on the exhaust pressure, data on HMDS concentration and temperature, and data on image processing of the wafer W in developing units 32, 34; data on the exhaust pressure, data on image processing of the wafer W in the post-exposure baking unit 67; and so on are obtained as the examination information.

In the correction information providing process P3 in the above-described embodiment, the management information is provided to the manager on the factory 2 side and the poor condition is solved by the manager on the factory 2 side, but the host computer 7 may transmit the management information directly to the coating and developing system to have the coating and developing system receiving this management information automatically correct the poor condition. For example, the manager on the vendor 6 side inputs the management information to the host computer 7 and this management information is transmitted to the AGC 4 through the Internet 8. Then, it is further transmitted from the AGC 4 to the first control part 80 of the coating and developing system M1 having the poor condition. At this time, the managing computer 5 of the factory 2 is also given a notification that the management information is transmitted to the coating and developing system M1 to have the manager on the factory 2 side informed of this. Thereafter, the first control part 80 receiving this management information changes and corrects set values and so on based on this management information. Thereby, the poor condition can be solved automatically without the help of the manager on the factory 2 side.

Incidentally, since the above automatic correction is limited to the poor condition which can be solved by the change of the setting and so on, the correction based on the manual given by the manager on the factory 2 side as is previously described may be used along with this.

In the above-described embodiment, the examining unit K1 is disposed on the rear side of the cassette station 20, but it may be disposed as a unit in the processing station 21.

Further, it may be disposed in a place distant from the coating and developing system M1. When the examining unit K1 is disposed in the place distant from the coating and developing system M1, the wafer W may be carried between the coating and developing system M1 and the examining unit K1, for example, by a worker, an AGV (a carrier robot for carrying the wafer W), or the like.

The above-described embodiment is the managing system relating to the coating and developing system, but the processing system of the wafer may be other processing system, for example, an aligner, an etching unit, and so on. Further, it is the managing system only for the coating and developing system, but a plural kinds of the above processing systems may be included. Further, factories in a plurality of places may be managed. The managing unit on the vendor side may also be disposed in a plurality of places instead of disposing it in one place. The present invention is applied to the processing system of the wafer, but it is applicable to processing systems of substrates other than the wafer, for example, of an LCD substrate and a mask reticle substrate for a photo mast.

According to the present invention, a quick and appropriate measure can be taken for a poor condition of a processing system of a substrate and the processing system can be managed appropriately.

What is claimed is:

1. A managing system for managing a processing system of a substrate, comprising:

an information accumulation section for accumulating information on said processing system;

an information collecting unit for collecting the information from said information accumulation section; and a managing unit for obtaining the information in said information collecting unit via the Internet or an intranet to manage said processing system based on the information, wherein:

said information accumulation section is provided in said processing system;

said processing system includes a resist coating unit for coating the substrate with a resist solution; and in said information accumulation section, as information on the resist coating unit, trace data on a rotational speed of the substrate, transfer data on a resist discharge nozzle, data on a discharge flow rate of a resist solution, trace data on a temperature and a humidity in a casing, data on an air speed in a cup surrounding an outside of the substrate, data on a temperature of the cup, and data on a vertical movement speed of a spin chuck, are accumulated.

2. A managing system according to claim 1, wherein said processing system has a plurality of processing units, and wherein information on each of the processing units is accumulated in said information accumulation section.

3. A managing system according to claim 1, wherein said information collecting unit collects the information in said information accumulation section according to an instruction of said managing unit.

4. A managing system according to claim 1, wherein said managing unit diagnoses said processing system based on the obtained information and when a poor condition exists, said managing unit presents a countermeasure appropriate for the poor condition.

5. A managing system according to claim 4,
wherein the poor condition is related to temperature and humidity of the resist coating unit.

6. A managing system according to claim 1,
wherein, when a trouble occurs in said processing system, said managing unit collects the information on said processing system, specifies a cause of the trouble of the processing system based on the information, and presents a countermeasure for the trouble.

7. A managing system according to claim 6,
wherein past trouble information on said processing system is registered in said managing unit and the cause of the trouble is specified based on the trouble information.

8. A managing system according to claim 6,
wherein said managing unit notifies the occurrence of the trouble both to a manager on a side of a vendor of said processing system and a manager on a side of a factory where said processing system is installed, further judges, according to a content of the trouble, which one of the manager on the vendor side or the manager of the factory side should handle the trouble, and notifies a result of the judgment to both of the managers.

9. A managing system according to claim 6,
wherein the trouble includes a case when a numerical value on a processing environment of the substrate exceeds a threshold value, a case when the processing system or a unit in the processing system is out of order, and a case when the substrate is broken or dropped.

10. A managing system according to claim 1,
wherein said managing unit notifies said information collecting unit via the Internet or the intranet of management information, which is derived based on the obtained information, for managing said processing system, and
wherein said information collecting unit manages said processing system based on the management information.

11. A managing system according to claim 1, wherein
in said information collecting unit, contents of troubles occurring in said processing system are classified into levels and set in advance; and
when a trouble occurs, said information collecting unit designates a level of the trouble and changes a communication destination of information on the trouble in accordance with the designated level.

12. A managing system according to claim 11,
wherein a trouble that is to be handled, by a manager on a vendor side of said processing system, a trouble that a manager on a factory side may be able to handle, and a trouble that the manager on the factory side can handle are classified into different levels.

13. A managing system according to claim 11, wherein said processing system includes a carrier unit for carrying the substrate; and
(1) troubles concerning when an actual position of the carrier unit differs from a position of the carrier unit recognized by a control system of the carrier unit, when the control system related to carriage of the substrate has an error, and when an initialization operation of the carrier unit is impossible to be executed, (2) troubles concerning when a pose command of the carrier unit is impossible to be cancelled, when the carrier unit is impossible to move, when the substrate protrudes from the carrier unit, and when a drive belt in the carrier unit is cut, and (3) troubles concerning when an area sensor detects a predetermined object to be detected, and when the substrate is not in a cassette where it should be, are classified into different levels.

14. The managing system of claim 1, wherein:
said processing system includes a substrate carrier unit; and
in said information accumulation section, pulse accumulated data for movement and movement speed data on the substrate carrier unit, are accumulated.

15. The managing system of claim 1, wherein:
said processing system includes an edge exposure unit for exposing an outer circumference of the substrate; and
in said information accumulation section, as information on the edge exposure unit, luminance trace data of exposure, and data on a position of the substrate detected by a CCD sensor, are accumulated.

16. A managing method of managing a processing system of a substrate, comprising:
collecting, by an information collecting unit, information on the processing system accumulated in an information accumulation section of the processing system according to an instruction of a managing unit; and
obtaining, by the managing unit, the information via the Internet or an intranet to manage the processing system based on the information,
wherein, in the information accumulation section, as information on a resist coating unit provided in the processing system, trace data on a rotational speed of the substrate, transfer data on a resist discharge nozzle, data on a discharge flow rate of a resist solution, trace data on a temperature and a humidity in a casing, data on an air speed in a cup surrounding an outside of the substrate, data on a temperature of the cup, and data on a vertical movement speed of a spin chuck, are accumulated.

17. A managing method according to claim 16,
wherein the managing unit gives the instruction periodically.

18. A managing method according to claim 16,
wherein the managing unit gives the instruction when a trouble occurs in the processing system.

19. A managing method according to claim 18,
wherein the trouble of the processing system includes a case when a numerical value on a processing environment of the substrate exceeds a threshold value, a case when the processing system or a unit in the processing system is out of order, and a case when the substrate is broken or dropped.

20. A managing method according to claim 16,
wherein the managing unit notifies an occurrence of a trouble both to a manager on a side of a vendor of the processing system and a manager on side of a factory where the processing system is installed, judges which one of the manager on the vendor side or the manager on the factory side should handle the trouble, according to a content of the trouble, and notifies a result of the judgment to both of the managers.

21. The managing method of claim 16
wherein, in the information accumulation section, pulse accumulated data for movement and movement speed data on a substrate carrier unit provided in the processing system, are accumulated.

22. The managing method of claim 16
wherein, in said information accumulation section, as information on an edge exposure unit provided in the processing system, illuminance trace data of exposure, and data on a position of the substrate detected by a CCD sensor, are accumulated.

23. A managing system for managing a processing system of a substrate, comprising:
an examining unit, provided at a factory where said processing system is installed, for examining the substrate processed in said processing system; and
a host computer, provided at a vendor associated with said processing system, for obtaining via the Internet, examination information on the substrate examined in said examining unit,
wherein said processing system includes a resist coating unit for coating the substrate with a resist solution; and
the examination information includes position sensor data on the substrate, data on the number of operation times of the unit, data on a speed of drive systems, data on an exhaust pressure, image data on a mist trap for removing mist, and data on a pressure of a tank which is a supply source of the resist solution, in the resist coating unit.

24. A managing system according to claim 23, further comprising:
an information accumulation section which is provided at the factory, for accumulating the examination information,
wherein the examination information accumulated in said information accumulation section is obtainable by said host computer.

25. A managing system according to claim 23, further comprising:
an information collecting/transmitting unit which is provided at the factory, for collecting the examination information in the plural processing systems and transmitting the examination information to said host computer.

26. A managing system according to claim 23, wherein said host computer periodically obtains the examination information via the Internet.

27. A managing system according to claim 23, wherein said host computer obtains the examination information via the Internet when a poor condition occurs in said processing system.

28. A managing system according to claim 23, wherein, when a poor condition exists in said processing system, said host computer notifies a manager at the factory of management information for solving the poor condition.

29. A managing system according to claim 23, wherein, when a poor condition exists in said processing system, said host computer transmits to said processing system management information for solving the poor condition through the Internet to automatically correct said processing system.

30. A managing system according to claim 23, wherein said processing system includes a baking unit; and
the examination information includes position sensor data on the substrate and data on an exhaust pressure in the baking unit.

31. A host computer constituting a managing system for managing a processing system of a substrate in a factory, and provided at a vendor associated with said processing system, comprising:
a communication unit for obtaining, through the Internet, examination information on the substrate processed in said processing system,
wherein said processing system includes a resist coating unit for coating the substrate with a resist solution; and
the examination information includes position sensor data on the substrate, data on the number of operation times of the unit, data on a speed of drive systems, data on an exhaust pressure, image date on a mist trap for removing mist, and data on a pressure of a tank which is a supply source of the resist solution, in the resist coating unit.

32. A host computer according to claim 31, further comprising:
a notifying unit for notifying a manager at the factory of management information for solving a poor condition of said processing system.

33. A host computer according to claim 31,
wherein said communication unit transmits to said processing system management information for solving the poor condition of said processing system to automatically correct said processing system.

34. A managing system according to claim 31, wherein said processing system includes a baking unit; and
the examination information includes position sensor data on the substrate and data on an exhaust pressure in the baking unit.

35. An information collecting/transmitting unit constituting a managing system for managing a processing system of a substrate in a factory, and provided at the factory, comprising:
a communication unit for collecting examination information on the substrate processed in plural processing systems and transmitting the examination information to a host computer associated with a vendor via the Internet,
wherein said processing system includes a resist coating unit for coating the substrate with a resist solution; and
the examination information includes position sensor data on the substrate, data on the number of operation times of the unit data on a speed of drive systems, data on an exhaust pressure, image data on a mist trap for removing mist, and data on a pressure of a tank which is a supply source of the resist solution, in the resist coating unit.

36. An information collecting/transmitting unit according to claim 35, wherein
said processing system includes a baking unit; and
the examination information includes position sensor data on the substrate and data on an exhaust pressure in the baking unit.

37. A managing method of managing a processing system of a substrate in a system comprising:
an examining unit for examining the substrate processed in the processing system in a factory;
an information collecting/transmitting unit which is configured to collect examination information on the substrate examined in the examining unit and to transmit the examination information via the Internet; and
a receiving means which is provided on a vendor side, for receiving the examination information, said managing method comprising the steps of:
collecting the examination information on the substrate examined in the examining unit, and thereafter transmitting the examination information to the receiving means on the vendor side via the Internet by said information collecting/transmitting unit; and
managing the processing unit based on the received examination information by a manager on the vendor side, wherein the processing system includes a resist coating unit for coating the substrate with a resist solution; and the examination information includes position sensor data on the substrate, data on the number of operation times of the unit, data on a speed of each of drive systems, data on an exhaust pressure, image data on a mist trap for removing mist, and data on a pressure of a tank which is a supply source of the resist solution, in the resist coating unit.

38. A managing method according to claim 37, wherein the processing system includes a baking unit; and the examination information includes position sensor data on the substrate and data on an exhaust pressure in the baking unit.

39. A managing system for managing a processing system of a substrate, comprising:

an information accumulation section for accumulating information on said processing system;

an information collecting unit for collecting the information from said information accumulation section; and a managing unit for obtaining the information in said information collecting unit via the Internet or an intranet to manage said processing system based on the information, wherein:

said information accumulation section is provided in said processing system;

said processing system includes a baking unit for heating the substrate and a cooling unit for cooling the substrate; and in said information accumulation section, as information on the baking unit and cooling unit, trace data on a temperature of a plate on which the substrate is placed, data on a vertical movement speed of a cover covering an area above the substrate, trace data on a temperature in the baking unit, trace data on a humidity in the baking unit, trace data on an air speed in the baking unit, and data on a movement speed of a hoisting/lowering pin of the substrate, are accumulated.

40. A managing system for managing a processing system of a substrate, comprising:

an information accumulation section for accumulating information on said processing system;

an information collecting unit for collecting the information from said information accumulation section; and a managing unit for obtaining the information in said information collecting unit via the Internet or an intranet to manage said processing system based on the information, wherein:

said information accumulation section is provided in said processing system; and in said information accumulation section, as information on a control of the processing system, step timechart data on a recipe of processing the substrate, data on a conveying cycle of the substrate, trace data on a temperature in the processing system, trace date on a humidity in the processing system, trace data on an air speed in the processing system, and trace data on a pressure in the processing system, are accumulated.

41. A managing method of managing a processing system of a substrate, comprising:

collecting, by an information collecting unit, information on the processing system accumulated in an information accumulation section of the processing system according to an instruction of a managing unit; and obtaining, by the managing unit, the information via the Internet or an intranet to manage the processing system based on the information, wherein, in said information accumulation section, as information on a baking unit and a cooling unit provided in the processing system, trace data on a temperature of a plate on which the substrate is placed, data on a vertical movement speed of a cover covering an area above the substrate, trace data on a temperature in the baking unit trace data on a humidity in the baking unit, trace data on an air speed in the baking unit, and data on a movement speed of a hoisting/lowering pin of the substrate, are accumulated.

42. A managing method of managing a processing system of a substrate, comprising:

collecting, by an information collecting unit, information on the processing system accumulated in an information accumulation section of the processing system according to an instruction of a managing unit; and obtaining, by the managing unit, the information via the Internet or an intranet to manage the processing system based on the information, wherein, in said information accumulation section, as information on a control of the processing system, step timechart data on a recipe of processing the substrate, data on a conveying cycle of the substrate, trace data on a temperature in the processing system, trace data on a humidity in the processing system, trace data on an air speed in the processing system, and trace data on a pressure in the processing system, are accumulated.

* * * * *